(12) United States Patent
Zhang

(10) Patent No.: US 11,330,554 B2
(45) Date of Patent: May 10, 2022

(54) DISCONTINUOUS RECEPTION COMMUNICATION SYNCHRONIZATION METHOD AND APPARATUS

(71) Applicant: HUAWEI TECHNOLOGIES CO., LTD., Guangdong (CN)

(72) Inventor: Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/114,132

(22) Filed: Dec. 7, 2020

(65) Prior Publication Data

US 2021/0092709 A1 Mar. 25, 2021

Related U.S. Application Data

(63) Continuation of application No. 16/875,386, filed on May 15, 2020, now Pat. No. 10,912,058, which is a
(Continued)

(51) Int. Cl.
*H04W 68/00* (2009.01)
*H04W 52/02* (2009.01)
*H04W 76/28* (2018.01)

(52) U.S. Cl.
CPC ..... *H04W 68/005* (2013.01); *H04W 52/0216* (2013.01); *H04W 52/0229* (2013.01); *H04W 76/28* (2018.02); *Y02D 30/70* (2020.08)

(58) Field of Classification Search
None
See application file for complete search history.

(56) References Cited

U.S. PATENT DOCUMENTS 10,912,058 B2 * 2/2021 Zhang ............... H04W 52/0229
2008/0186892 A1 8/2008 Damnjanovic
(Continued)

FOREIGN PATENT DOCUMENTS

CN 101111051 1/2008
CN 101690348 3/2010
(Continued)

OTHER PUBLICATIONS

3rd Generation Partnership Project; Technical Specification Group Core Network and Terminals; Non-Access-Stratum (NAS) protocol for Evolved Packet System (EPS); Stage 3 (Release 11), 3GPP TS 24.301 V11.5.0, Dec. 2012, 344 pages.
(Continued)

*Primary Examiner* — Gary Lafontant
(74) *Attorney, Agent, or Firm* — Fish & Richardson P.C.

(57) ABSTRACT

The present disclosure relates to discontinuous reception communication synchronization methods and apparatus. One example method includes receiving a system message that is broadcast by a base station and that indicates that the base station supports a capability of extended discontinuous reception (DRX), sending an extended DRX value to a network element of a core network, receiving, from the network element of the core network, extended DRX support information indicating that the network element of the core network supports the extended DRX, calculating a paging time using the extended DRX value, and receiving a paging message delivered from the base station according to the paging time.

16 Claims, 11 Drawing Sheets

Related U.S. Application Data continuation of application No. 16/678,140, filed on Nov. 8, 2019, now Pat. No. 10,687,305, which is a continuation of application No. 14/801,370, filed on Jul. 16, 2015, now Pat. No. 10,512,060, which is a continuation of application No. PCT/CN2013/070635, filed on Jan. 17, 2013.

(56) References Cited

U.S. PATENT DOCUMENTS

| | | | |
|---|---|---|---|
| 2009/0040955 | A1 | 2/2009 | Jung et al. |
| 2010/0184458 | A1 | 1/2010 | Fodor et al. |
| 2010/0130237 | A1 | 5/2010 | Kitazoe et al. |
| 2011/0170530 | A1 | 7/2011 | Akiyoshi |
| 2012/0064903 | A1 | 3/2012 | Pani et al. |
| 2013/0308507 | A1 | 11/2013 | Wanstedt et al. |
| 2016/0112934 | A1 | 4/2016 | Shohei et al. |
| 2020/0077360 | A1 | 3/2020 | Zhang |

FOREIGN PATENT DOCUMENTS

| | | |
|---|---|---|
| CN | 102217408 | 10/2011 |
| CN | 102257859 | 11/2011 |
| CN | 102640556 | 8/2012 |
| CN | 102783221 | 11/2012 |
| EP | 2158782 | 11/2008 |
| EP | 2359652 | 5/2010 |
| WO | 2008143563 | 11/2008 |
| WO | 2009117634 A1 | 9/2009 |
| WO | 2012149321 | 11/2012 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 11), 3GPP TS 36.300 V11.4.0, Dec. 2012, 208 pages.

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.2.0, Dec. 2012, 340 pages.

3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.2.0, Dec. 2012, 33 pages.

3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11 .2.0, Dec. 2012, 272 pages.

3rd Generation Partnership Project; Technical Specification Group Services and System Aspects; Architecture Enhancements to Facilitate Communications with Packet Data Networks and Applications (Release 11), 3GPP TS 23.682 V11.3.0, Dec. 2012, 29 pages.

3rd Generation Partnership Project; Technical Specification Group Services and System Aspects; General Packet Radio Service (GPRS) enhancements for Evolved Universal Terrestrial Radio Access Network (E-UTRAN) access (Release 11), 3GPP TS 23.401 V1 1 .4.0, Dec. 2012, 284 pages.

3rd Generation Partnership Project; Technical Specification Group Services and System Aspects; Machine-Type and other Mobile Data Applications Communications Enhancements (Release 1 2), 3GPP TR 23.887 V0.6.0, Dec. 2012, 95 pages.

3GPP TS 24.008 V12.0.0 (Dec. 2012), "3rd Generation Partnership Project; Technical Specification Group Core Network and Terminals; Mobile radio interface Layer 3 specification; Core network protocols; Stage 3 (Release 12)," Dec. 2012, 678 pages.

Office Action issued in Chinese Application No. 201811275495.3 dated Jul. 29, 2021, 4 pages.

\* cited by examiner

DISCONTINUOUS RECEPTION COMMUNICATION SYNCHRONIZATION METHOD AND APPARATUS

CROSS-REFERENCE TO RELATED APPLICATIONS

This application is a continuation of U.S. patent application Ser. No. 16/875,386, filed on May 15, 2020, which is a continuation of U.S. patent application Ser. No. 16/678,140, filed on Nov. 8, 2019, now U.S. Pat. No. 10,687,305, which is a continuation of U.S. patent application Ser. No. 14/801,370, filed on Jul. 16, 2015, now U.S. Pat. No. 10,512,060, which is a continuation of International Application No. PCT/CN2013/070635, filed on Jan. 17, 2013. All of the aforementioned patent applications are hereby incorporated by reference in their entireties.

TECHNICAL FIELD

The present invention relates to communications technologies, and in particular, to a discontinuous reception communication synchronization method and apparatus.

BACKGROUND

As the telecommunications industry develops, signaling is more frequently exchanged between a user equipment (UE), a base station, and a network element of a core network (CN). Therefore, the UE needs to listen to information about a paging channel in real time, so as to ensure that when the CN delivers a paging message to the UE, the UE can listen to the paging message synchronously; however, the real-time listening by the UE increases power consumed by the UE.

To reduce the power consumed by a UE, in the prior art, a discontinuous reception (DRX) technology is introduced, that is, the UE stops listening on a channel and stays in a sleep state for a period of time, and wakes up every a period of time. A system may indicate a time interval between each waking of the UE. In this way, when receiving a downlink service, a network element of a core network delivers a paging message only at a time when the UE wakes up, so as to achieve a purpose of saving power for the UE. However, this technology needs a mechanism to ensure synchronization of a listening time of the UE and a time when a network delivers paging; otherwise, a paging failure may occur. In an existing DRX technology, a UE sends a non-access stratum (NAS) request message that carries a DRX value to a network element of a core network; the network element of the core network sends a paging message that carries the DRX value to the base station after receiving the request message; the base station also broadcasts a default DRX value, compares the foregoing two DRX values, selects a smaller one to calculate a paging time, and then sends the paging message at the paging time. The UE also compares the default DRX value broadcast by the base station with the DRX value provided by the UE to the network element of the CN, and selects a smaller one to calculate a time when the UE receives the paging message, thereby ensuring synchronization of paging time of the UE and the network.

However, in the prior art, generally the default DRX value broadcast by the base station is relatively small, which causes the UE to frequently wake up to listen on a paging channel, and therefore power consumed by the UE cannot be reduced desirably. In addition, when the UE reports a longer DRX cycle, if the base station still uses the default DRX, it may causes that DRX of the UE and DRX of the network are asynchronous, thereby paging message loss.

SUMMARY

Embodiments of the present invention provide a discontinuous reception communication synchronization method and apparatus, so as to resolve a problem of extra power consumption caused by that a terminal frequently listens to a paging message during a process of communicating with a network, and also to avoid paging loss caused by that DRX between the terminal and the network is asynchronous.

A first aspect of the embodiments of the present invention provides a discontinuous reception communication synchronization method, including receiving a paging message delivered by a network element of a core network, where the paging message includes an extended discontinuous reception DRX indicator and/or extended DRX, calculating a paging time according to the extended DRX indicator and/or the extended DRX, and paging a terminal at the paging time.

With reference to the first aspect, in a first possible implementation manner of the first aspect, before the calculating a paging time according to the extended DRX indicator and/or the extended DRX, the method further includes notifying the terminal of the extended DRX by broadcasting.

With reference to the first aspect, in a second possible implementation manner of the first aspect, before the calculating a paging time according to the extended DRX indicator and/or the extended DRX, the method further includes acquiring whether the network element of the core network supports a capability of the extended DRX, and when both a base station and the network element of the core network support the extended DRX, notifying the terminal of the extended DRX by broadcasting.

With reference to the first aspect, in a third possible implementation manner of the first aspect, the extended DRX indicator in the paging message includes a low power indicator, a low priority indicator, a single cell, an extended paging priority, or a DRX type.

With reference to any one of the first aspect to the third possible implementation manner of the first aspect, in a fourth possible implementation manner of the first aspect, before the calculating a paging time according to the extended DRX indicator and/or the extended DRX, the method further includes notifying, by broadcasting, the terminal whether the base station, to which the terminal belongs, supports the capability of the extended DRX.

With reference to any one of the first aspect to the fourth possible implementation manner of the first aspect, in a fifth possible implementation manner of the first aspect, before the calculating a paging time according to the extended DRX indicator and/or the extended DRX, the method further includes acquiring whether the network element of the core network supports the capability of the extended DRX, and when both the base station to which the terminal belongs and the network element of the core network support the capability of the extended DRX, notifying, by broadcasting, the terminal that the capability of the extended DRX is supported.

A second aspect of the embodiments of the present invention provides a discontinuous reception communication synchronization method, including receiving extended discontinuous reception DRX or an extended DRX indicator reported by a terminal, and delivering a paging message to a base station when a downlink service of the terminal is detected, where the paging message carries the extended DRX indicator and/or the extended DRX, so as to instruct the base station to calculate a paging time by using the extended DRX.

With reference to the second aspect, in a first possible implementation manner of the second aspect, the extended discontinuous reception DRX indicator includes a low power indicator, a low priority indicator, a single cell, an extended paging priority, or a DRX type.

With reference to the second aspect, in a second possible implementation manner of the second aspect, before the receiving extended DRX or an extended DRX indicator reported by a terminal, the method further includes notifying, by using signaling or an operation, administration and maintenance system, the base station whether a network element, to which the terminal belongs, of a core network supports a capability of the extended DRX, or statically configuring, on the base station, whether a network element, to which the terminal belongs, of a core network supports a capability of the extended DRX, so as to instruct the base station to notify the terminal by broadcasting.

With reference to the second aspect, in a third possible implementation manner of the second aspect, the receiving extended DRX reported by a terminal includes receiving non-extended DRX or the extended DRX reported by the terminal, when it is identified that a network element, to which the terminal belongs, of a core network supports a capability of the extended DRX, notifying the terminal that the network element, to which the terminal belongs, of the core network supports the capability of the extended DRX, and receiving the extended DRX reported by the terminal when the terminal enables the extended DRX.

A third aspect of the embodiments of the present invention provides a discontinuous reception communication synchronization method, including reporting an extended discontinuous DRX indicator or extended DRX to a network element of a core network, and calculating a paging time by using the extended DRX.

With reference to the third aspect, in a first possible implementation manner of the third aspect, before the calculating a paging time by using the extended DRX, the method further includes receiving the extended DRX notified by broadcasting by the base station, and reporting the extended DRX indicator to the network element of the core network.

With reference to the first possible implementation manner of the third aspect, in a second possible implementation manner of the third aspect, the extended DRX indicator includes a low power indicator or a low priority indicator.

With reference to the third aspect, in a third possible implementation manner of the third aspect, the reporting an extended DRX indicator or extended DRX to a network element of a core network includes receiving whether the base station supports a capability of the extended DRX, which is notified by broadcasting by the base station, and when the base station supports the capability of the extended DRX, reporting the extended DRX to the network element of the core network.

With reference to the third aspect, in a fourth possible implementation manner of the third aspect, the reporting an extended DRX indicator or extended DRX to a network element of a core network includes receiving that a capability of the extended DRX is supported, which is notified by broadcasting by the base station when both the base station and the network element of the core network support the capability of the extended DRX, and reporting the extended DRX to the network element of the core network.

With reference to the third aspect, in a fifth possible implementation manner of the third aspect, the reporting an extended DRX indicator or extended DRX to a network element of a core network includes reporting non-extended DRX or the extended DRX to the network element of the core network, receiving whether the network element of the core network supports a capability of the extended DRX, and when the network element of the core network supports the capability of the extended DRX, reporting the extended DRX to the network element of the core network.

A fourth aspect of the embodiments of the present invention provides a discontinuous reception communication synchronization apparatus, including a paging-message reception module, configured to receive a paging message delivered by a network element of a core network, where the paging message includes an extended discontinuous reception DRX indicator and/or extended DRX, a processing module, configured to calculate a paging time according to the extended discontinuous reception DRX indicator and/or the extended DRX received by the paging-message reception module, and a paging module, configured to page a terminal at the paging time that is calculated by the processing module.

With reference to the fourth aspect, in a first possible implementation manner of the fourth aspect, the apparatus further includes a first broadcasting module, configured to notify the terminal of the extended DRX by broadcasting before the processing module calculates the paging time.

With reference to the fourth aspect, in a second possible implementation manner of the fourth aspect, the apparatus further includes a first acquiring module, configured to acquire, before the processing module calculates the paging time, whether the network element of the core network supports a capability of the extended DRX, and a third broadcasting module, configured to notify the terminal of the extended DRX by broadcasting when both a base station and the core network support the extended DRX.

With reference to the fourth aspect, in a third possible implementation manner of the fourth aspect, the extended DRX indicator received by the paging-message reception module includes a low power indicator, a low priority indicator, a single cell, an extended paging priority, or a DRX type.

With reference to the fourth aspect, in a fourth possible implementation manner of the fourth aspect, the apparatus further includes a second broadcasting module, configured to notify, by broadcasting before the processing module calculates the paging time, the terminal whether a base station, to which the terminal belongs, supports a capability of the extended DRX.

With reference to the fourth aspect to the fourth possible implementation manner of the fourth aspect, in a fifth possible implementation manner of the fourth aspect, the apparatus further includes a second acquiring module, configured to acquire, before the processing module calculates the paging time, whether the network element of the core network supports a capability of the extended DRX, and a fourth broadcasting module, configured to notify, by broadcasting when both the base station to which the terminal belongs and the network element of the core network support the capability of the extended DRX, the terminal that the capability of the extended DRX is supported.

A fifth aspect of the embodiments of the present invention provides a discontinuous reception communication synchronization apparatus, including a DRX reception module, configured to receive extended discontinuous reception DRX or an extended DRX indicator reported by a terminal, and a paging-message sending module, configured to deliver a paging message to a base station when a downlink service of the terminal is detected, where the paging message carries the extended DRX indicator and/or the extended DRX received by the DRX reception module, so as to instruct the base station to calculate a paging time by using the extended DRX.

With reference to the fifth aspect, in a first possible implementation manner of the fifth aspect, the extended DRX indicator received by the DRX reception module includes a low power indicator, a low priority indicator, a single cell, an extended paging priority, or a DRX type.

With reference to the fifth aspect, in a second possible implementation manner of the fifth aspect, the apparatus further includes a capability notification module, configured to, before the DRX reception module receives the extended DRX or the extended DRX indicator reported by the terminal, notify, by using signaling or an operation, administration and maintenance system, the base station whether a network element, to which the terminal belongs, of a core network supports a capability of the extended DRX, or statically configure, on the base station, whether a network element, to which the terminal belongs, of a core network supports a capability of the extended DRX, so as to instruct the base station to notify the terminal by broadcasting.

With reference to the fifth aspect, in a third possible implementation manner of the fifth aspect, the DRX reception module includes a first DRX reception unit, configured to receive non-extended DRX or the extended DRX reported by the terminal, a first identification unit, configured to, when it is identified that a network element, to which the terminal belongs, of a core network supports a capability of the extended DRX, notify the terminal that the network element, to which the terminal belongs, of the core network supports the capability of the extended DRX, and a second DRX reception unit, configured to receive the extended DRX received by the first DRX reception unit when the terminal enables the extended DRX.

A sixth aspect of the embodiments of the present invention provides a discontinuous reception communication synchronization apparatus, including a reporting module, configured to report an extended discontinuous reception DRX indicator or extended DRX to a network element of a core network, and a calculating module, configured to calculate a paging time by using the extended DRX reported by the reporting module.

With reference to the sixth aspect, in a first possible implementation manner of the sixth aspect, the apparatus further includes a reception module, configured to receive, before the calculating module calculates the paging time by using the extended DRX, the extended DRX notified by broadcasting by the base station, and an indicator reporting module, configured to report the extended DRX indicator to the network element of the core network after the reception module receives the extended DRX.

With reference to the sixth aspect, in a second possible implementation manner of the sixth aspect, the extended DRX indicator reported by the reporting module includes a low power indicator or a low priority indicator.

With reference to the sixth aspect, in a third possible implementation manner of the sixth aspect, the reporting module includes a first capability reception unit, configured to receive whether the base station supports a capability of the extended DRX, which is notified by broadcasting by the base station, and when the base station supports the capability of the extended DRX, report the extended DRX to the network element of the core network.

With reference to the sixth aspect, in a fourth possible implementation manner of the sixth aspect, the reporting module includes a second capability reception unit, configured to receive that a capability of the extended DRX is supported, which is notified by broadcasting by the base station when both the base station and the network element of the core network support the capability of the extended DRX, and report the extended DRX to the network element of the core network.

With reference to the sixth aspect, in a fifth possible implementation manner of the sixth aspect, the reporting module includes a reporting unit, configured to report non-extended DRX or the extended DRX to the network element of the core network, and a third capability reception unit, configured to receive whether the network element of the core network supports a capability of the extended DRX, and when the network element of the core network supports the capability of the extended DRX, report the extended DRX to the network element of the core network.

In the solutions provided in the embodiments of the present invention, a terminal reports extended DRX to a network element of a core network, and the network element of the core network receives the extended DRX, adds an extended DRX indicator and/or the extended DRX to a paging message delivered to a base station, so as to instruct the base station to calculate a paging time by using the extended DRX, and pages the terminal at the paging time, thereby overcoming a problem of extra power consumption caused by that the terminal frequently listens to a paging message during a process of communicating with a network due to that in the prior art, the base station selects a smaller one between default DRX that is broadcast and DRX delivered by the network element of the core network, and also avoiding a paging loss caused by that DRX between the terminal and the network is asynchronous.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
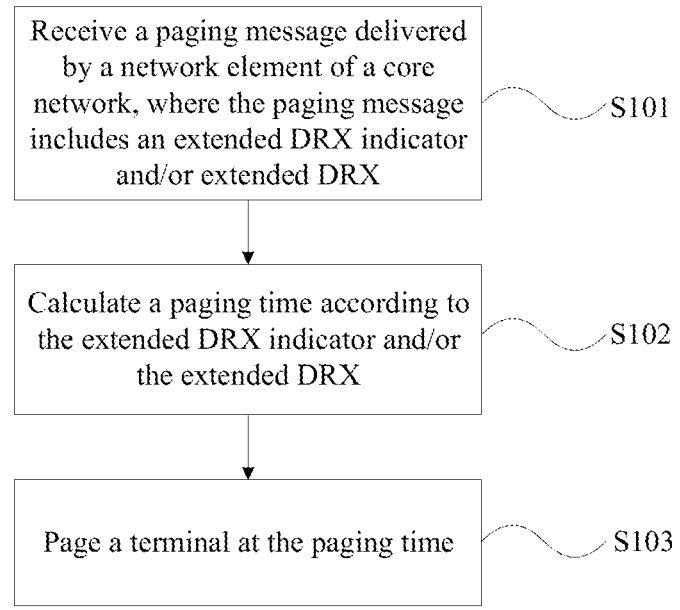
FIG. 1 is a schematic flowchart of an embodiment of a discontinuous reception communication synchronization method according to the present invention.

FIG. 1 is a schematic flowchart of an embodiment of a discontinuous reception communication synchronization method according to the present invention. The method in this embodiment is executed by a discontinuous reception communication synchronization apparatus integrated in a base station. The method in this embodiment includes the following steps.

S101: Receive a paging message delivered by a network element of a core network, where the paging message includes an extended discontinuous reception (DRX) indicator and/or extended DRX.

S102: Calculate a paging time according to the extended DRX indicator and/or the extended DRX.

S103: Page a terminal at the paging time.

Specifically, when the network element of the core network receives a downlink service and needs to trigger paging, the network element of the core network delivers the paging message to the base station, where the paging message carries the extended DRX indicator and/or the extended DRX. The extended DRX is a specific extended DRX value, the extended DRX value is greater than a default DRX value broadcast by the base station in the prior art, and when identifying the extended DRX value, the base station may consider that the paging time can be calculated by using the extended DRX value. The extended DRX indicator is used to instruct the base station to calculate the paging time by using the extended DRX value, but not to compare the extended DRX value with the default DRX value that is broadcast, and in this case, the extended DRX value may be carried in the paging message delivered by the network element of the core network, or may be learned by the base station by being notified in another approach. Alternatively, both the extended DRX indicator and the extended DRX value may be carried in the paging message, so that the base station is notified. In actual application, the extended DRX indicator in the paging message may be various implementation manners, such as a low power indicator, a low priority indicator, a single cell, an extended paging priority, or a DRX type indicator, and used to instruct the base station to use the extended DRX.

After determining that the extended DRX value is used, the base station may broadcast the extended DRX value to the terminal, or broadcast the default DRX value and control the terminal not to perform comparison, so that both the terminal and the base station can use the extended DRX value.

Correspondingly, in an LTE system, the base station is corresponding to an evolved Node B (eNB), and the network element of the core network is corresponding to a mobile management entity (MME). In a UMTS system, the base station is corresponding to a radio network controller (RNC), and the network element of the core network is corresponding to a serving general packet radio service (GPRS) support node (SGSN) or a mobile switching center (MSC), for a Global System for Mobile Communications/Enhanced Data Rates for Global System for Mobile Communications Evolution radio access network (GERAN) system. The base station is corresponding to a base station controller (BSC), and the network element of the core network is corresponding to an SGSN or an MSC.

In the solution provided in this embodiment of the present invention, a terminal reports extended DRX to a network element of a core network, and the network element of the core network receives the extended DRX, adds an extended DRX indicator and/or the extended DRX to a paging message delivered to a base station, so as to instruct the base station to calculate a paging time by using the extended DRX, and pages the terminal at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment shown in FIG. 1, before the calculating a paging time according to the extended DRX indicator and/or the extended DRX, preferably, the method further includes notifying the terminal of the extended DRX by broadcasting.

Specifically, the base station notifies the terminal of the extended DRX by broadcasting, so as to enable the terminal to calculate the paging time by using the extended DRX.

Further, the base station broadcasts, in a system message, the extended DRX (in this case, the base station directly broadcasts the extended DRX as long as the base station supports a capability of the extended DRX, regardless of whether the network element of the core network supports the capability of the extended DRX). After the terminal receives the extended DRX that is broadcast, if the terminal needs to enable the extended DRX, the terminal sends a non-access stratum (NAS) request message to the network element of the core network, where the request message may be an attachment request, a routing area update (RAU) request message, or a tracking area update (TAU) request message, and the NAS request message sent to the network element of the core network carries the extended DRX indicator, so that the network element of the core network learns that the terminal uses the extended DRX, the network element of the core network records the indicator and adds the extended DRX indicator to the paging message delivered to the base station, so as to instruct the base station to use the extended DRX, and after receiving the extended DRX indicator carried in the paging message, the base station calculates the paging time by using the extended DRX value broadcast by the base station, and similarly, the terminal also calculates the paging time by using the extended DRX value broadcast by the base station. It should be noted that, the extended DRX indicator reported by the terminal to the network element of the core network or the extended DRX indicator carried in the paging message delivered by the network element of the core network to the base station may be a low power indicator, or may be a low priority indicator. In this embodiment, in an LTE system, the base station is corresponding to an eNB, and the network element of the core network is corresponding to an MME, in a UMTS system, the base station is corresponding to an RNC, and the network element of the core network is corresponding to an SGSN or an MSC, and for a GERAN, the base station is corresponding to a BSC, and the network element of the core network is corresponding to an SGSN or an MSC.

In another embodiment of the present invention, based on the foregoing embodiment shown in FIG. 1, before the calculating a paging time according to the extended DRX indicator and/or the extended DRX, preferably, the method further includes acquiring whether the network element of the core network supports a capability of the extended DRX, and when both the base station and the network element of the core network support the extended DRX, notifying the terminal of the extended DRX by broadcasting.

Further, the base station acquires whether the network element of the core network supports the capability of the extended DRX, the network element of the core network notifies, by using signaling or an operation, administration and maintenance system (OAM), the base station whether the network element of the core network supports the capability of the extended DRX, or statically configures, on the base station, whether the network element of the core network supports the capability of the extended DRX, and when both the base station and the network element of the core network support the extended DRX, the base station notifies the terminal of specific extended DRX by broadcasting. For a follow-up process, refer to the foregoing method embodiment.

In the method provided in this embodiment, when both a base station and a network element of a core network support a capability of an extended DRX, the base station broadcasts specific extended DRX, after receiving the extended DRX, a terminal reports, to the network element of the core network, that an extended DRX indicator is used, the network element of the core network delivers a paging message and adds the extended DRX indicator to the paging message, so as to enable the base station to calculate a paging time by using the extended DRX, and similarly, the terminal calculates the paging time by using the extended DRX, and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 1, before the calculating a paging time according to the foregoing extended DRX indicator and/or the extended DRX, preferably, the method further includes notifying, by broadcasting, the terminal whether the base station, to which the terminal belongs, supports the capability of the extended DRX.

Specifically, the base station broadcasts, in a system message, whether the base station supports the capability of the extended DRX, so that the terminal learns whether the base station, to which the terminal belongs, supports the extended DRX. If the base station, to which the terminal belongs, broadcasts that the base station supports the capability of the extended DRX (in this case, the base station does not consider whether the network element of the core network supports the capability of the extended DRX), the terminal receives a broadcast indicator and sends an NAS request message to the network element of the core network, where the request message may be an attachment request, an RAU request message, or a TAU request message, and the NAS request message carries an extended DRX value, the network element of the core network records the extended DRX value in context, adds the extended DRX value to the paging message, and delivers to the base station, after receiving the extended DRX value carried in the paging message, the base station calculates the paging time by using the extended DRX value, and similarly, the terminal also calculates the paging time by using the reported extended DRX value. If the base station, to which the terminal belongs, does not support the extended DRX, the base station broadcasts that the base station does not support the extended DRX, and the terminal reports non-extended DRX to the network element of the core network after receiving the indicator, and a follow-up process is processed according to the prior art.

In the method provided in this embodiment, a base station broadcasts whether a capability of extended DRX is supported, on a premise that the base station supports the capability of the extended DRX, after receiving an indicator broadcast by the base station, a terminal reports, to a network element of a core network, the extended DRX that is used, the network element of the core network delivers a paging message to the base station and adds the extended DRX to the paging message, so as to enable the base station to calculate a paging time by using the extended DRX, and similarly, the terminal calculates the paging time by using the extended DRX and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 1, before the calculating a paging time according to the foregoing extended DRX indicator and/or the extended DRX, preferably, the method further includes acquiring whether the network element of the core network supports the capability of the extended DRX, and when both the base station, to which the terminal belongs, and the network element of the core network support the capability of the extended DRX, notifying, by broadcasting, the terminal that the capability of the extended DRX is supported.

Specifically, the network element of the core network notifies, by using signaling or OAM, the base station whether the network element of the core network supports the capability of the extended DRX, or statically configures, on the base station, whether the network element of the core network supports the capability of the extended DRX. If the network element of the core network supports the extended DRX, and the base station also supports the extended DRX, the base station broadcasts, in a system message, that the capability of the extended DRX is supported, the terminal sends an NAS request message to the network element of the core network after receiving the broadcast indicator, where the request message may be an attachment request, an RAU request message, or a TAU request message, and the NAS request message carries an extended DRX value, the network element of the core network records the extended DRX value, adds the extended DRX value to the paging message, and delivers to the base station, after receiving the extended DRX value carried in the paging message, the base station calculates the paging time by using the extended DRX value, and similarly, the terminal also calculates the paging time by using the reported extended DRX value.

In the method provided in this embodiment, on a premise that both a base station and a network element of a core network support a capability of extended DRX, the base station broadcasts that the capability of the extended DRX is supported, after receiving an indicator broadcast by the base station, a terminal reports, to the network element of the core network, that the extended DRX is used, the network element of the core network delivers a paging message to the base station and adds the extended DRX to the paging message, so as to enable the base station to calculate a paging time by using the extended DRX, and similarly, the terminal calculates the paging time by using the extended DRX, and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 2:
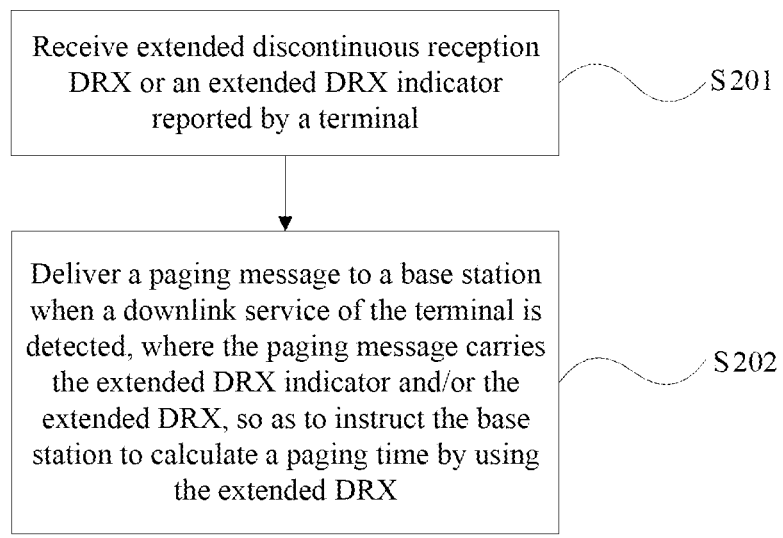
FIG. 2 is a schematic flowchart of another embodiment of a discontinuous reception communication synchronization method according to the present invention.

FIG. 2 is a schematic flowchart of another embodiment of a discontinuous reception communication synchronization method according to the present invention. The method in this embodiment is executed by a discontinuous reception communication synchronization apparatus integrated in a network element of a core network. The method in this embodiment includes the following steps.

S201: Receive extended discontinuous reception DRX or an extended DRX indicator reported by a terminal.

S202: Deliver a paging message to a base station when a downlink service of the terminal is detected, where the paging message carries the extended DRX indicator and/or the extended DRX, so as to instruct the base station to calculate a paging time by using the extended DRX.

Specifically, the terminal sends an NAS request message to the network element of the core network, where the request message may be an attachment request, an RAU request message, or a TAU request message, and the NAS request message carries an extended DRX value or the extended DRX indicator, the network element of the core network receives the extended DRX or the extended DRX indicator reported by the terminal, delivers the paging message to the base station when the network element of the core network detects the downlink service of the terminal, and adds the extended DRX indicator and/or the extended DRX to the paging message, so as to instruct the base station to calculate the paging time by using the extended DRX, and similarly, the terminal also calculates the paging time by using the extended DRX. It should be noted that, the extended DRX indicator reported by the terminal to the network element of the core network or the extended DRX indicator carried in the paging message delivered by the network element of the core network to the base station may be a low power indicator, may be a low priority indicator, or may be an extended paging priority or a DRX type indicator. In this embodiment, in an LTE system, the base station is corresponding to an eNB, and the network element of the core network is corresponding to an MME, in a UMTS system, the base station is corresponding to an RNC, and the network element of the core network is corresponding to an SGSN or an MSC, and for a GERAN, the base station is corresponding to a BSC, and the network element of the core network is corresponding to an SGSN or an MSC.

In the method provided in this embodiment, a terminal reports extended DRX to a network element of a core network, and the network element of the core network receives the extended DRX and adds an extended DRX indicator and/or the extended DRX to a paging message delivered to a base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 6, before the receiving an extended DRX or an extended DRX indicator reported by a terminal, preferably, the method further includes notifying, by using signaling or OA&M, the base station whether a network element, to which the terminal belongs, of a core network supports a capability of the extended DRX, or statically configuring, on the base station, whether a network element, to which the terminal belongs, of a core network supports a capability of the extended DRX, so as to instruct the base station to notify the terminal by broadcasting, where the step may have two implementation manners.

A first implementation manner is specifically, if the network element of the core network supports the extended DRX, the network element of the core network notifies, by using the signaling or the OA&M, the base station of that, or statically configures that on the base station, so as to instruct the base station to notify the terminal by broadcasting, on a premise that both the base station and the network element of the core network support the extended DRX, the base station broadcasts that the capability of the extended DRX is supported, the terminal sends an NAS request message to the network element of the core network after receiving an indicator broadcast by the base station, where the request message may be an attachment request, an RAU request message, or a TAU request message, and the NAS request message carries an extended DRX value, the network element of the core network records the extended DRX value, adds the DRX value to the paging message, and delivers to the base station, after receiving the extended DRX value carried in the paging message, the base station calculates the paging time by using the extended DRX value, and similarly, the terminal calculates the paging time by using the reported extended DRX value.

A second implementation manner is specifically, if the network element of the core network supports the extended DRX, the network element of the core network notifies, by using the signaling or the OA&M, the base station of that or statically configures that on the base station, so as to instruct the base station to notify the terminal by broadcasting, on a premise that both the base station and the network element of the core network support the extended DRX, the base station broadcasts, in a system message, specific extended DRX, after the terminal receives the extended DRX that is broadcast, if the terminal needs to enable the extended DRX, the terminal sends an NAS request message to the network element of the core network, where the request message may be an attachment request, an RAU request message, or a TAU request message, and the NAS request message sent to the network element of the core network carries the extended DRX indicator, so that the network element of the core network learns that the terminal uses the extended DRX, the network element of the core network records the indicator and adds the extended DRX indicator to the paging message delivered to the base station, so as to instruct the base station to use the extended DRX, after receiving the extended DRX indicator carried in the paging message, the base station calculates the paging time by using the extended DRX value broadcast by the base station, and similarly, the terminal also calculates the paging time by using the extended DRX value broadcast by the base station. It should be noted that, the extended DRX indicator reported by the terminal to the network element of the core network or the extended DRX indicator carried in the paging message delivered by the network element of the core network to the base station may be a low power indicator, or may be a low priority indicator.

In the method provided in this embodiment, after a network element of a core network notifies, by using signaling or OA&M, a base station whether a capability of extended DRX is supported, or statically configures, on the base station, whether a capability of extended DRX is supported, the base station broadcasts that the capability of the extended DRX or the extended DRX is supported, a terminal reports the extended DRX or an extended DRX indicator to the network element of the core network after receiving the broadcast indicator, and the network element of the core network adds the extended DRX and/or the extended DRX indicator to a paging message delivered to the base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 6, preferably, the receiving extended DRX reported by a terminal may be receiving non-extended DRX or the extended DRX reported by the terminal, when it is identified that a network element, to which the terminal belongs, of a core network supports a capability of the extended DRX, notifying the terminal that the network element, to which the terminal belongs, of the core network supports the capability of the extended DRX, and receiving the extended DRX reported by the terminal when the terminal enables the extended DRX.

Specifically, the terminal sends an NAS request message to the network element of the core network, where the request message may be an attachment request, an RAU request message, or a TAU request message, and the NAS request message carries the extended DRX or the non-extended DRX, the network element of the core network receives the NAS request message sent by the terminal and sends a reception message to the terminal, where an extended DRX support indicator is carried in the reception message, for example, the extended DRX support indicator is carried in an attachment reception NAS message to indicate that the network element, to which the terminal belongs, of the core network supports the extended DRX, after the terminal receives the indicator, if the terminal reports the non-extended DRX last time but needs to enable the extended DRX, the terminal sends a TAU request message or an RAU request message to update the DRX to be extended DRX, and reports the extended DRX to the network element of the core network, so that the network element of the core network adds the extended DRX to the paging message delivered to the base station, so as to enable the base station to calculate the paging time by using the extended DRX, if the network element of the core network does not support the capability of the extended DRX, and if the terminal reports the extended DRX last time, the terminal sends a TAU request message or an RAU request message to update the DRX to be non-extended DRX, and reports the non-extended DRX to the network element of the core network, so that the network element of the core network adds the non-extended DRX to the paging message delivered to the base station, so that processing is performed according to the prior art.

In the method provided in this embodiment, a network element of a core network notifies, by sending a reception message to a terminal, the terminal whether the network element, to which the terminal belongs, of the core network supports extended DRX, and updates DRX reported by the terminal, that is, in a case in which the terminal reports non-extended DRX to the network element of the core network but the network element of the core network supports the extended DRX, updates the non-extended DRX to be the extended DRX, so that the network element of the core network adds the extended DRX to a paging message delivered to a base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 3:
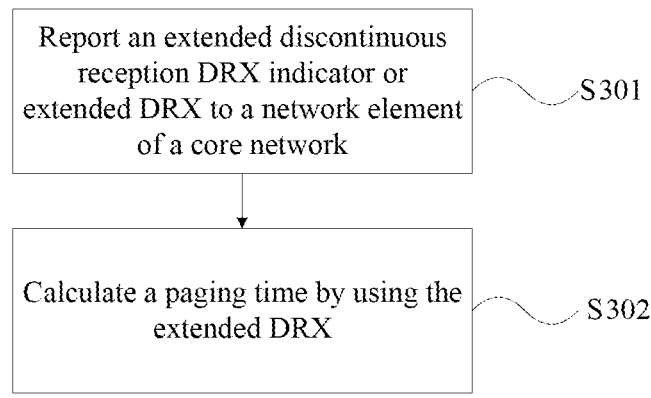
FIG. 3 is a schematic flowchart of another embodiment of a discontinuous reception communication synchronization method according to the present invention.

FIG. 3 is a schematic flowchart of another embodiment of a discontinuous reception communication synchronization method according to the present invention. The method in this embodiment is executed by a discontinuous reception communication synchronization apparatus integrated in a terminal. The method in this embodiment includes the following steps.

S301: Report an extended discontinuous reception DRX indicator or extended DRX to a network element of a core network.

S302: Calculate a paging time by using the extended DRX.

Specifically, the terminal sends an NAS request message to the network element of the core network, where the request message may be an attachment request, an RAU request message, or a TAU request message, and the NAS request message carries the extended DRX indicator or the extended DRX. After receiving the request, the network element of the core network delivers a paging message to a base station, and adds the extended DRX indicator and/or the extended DRX to the paging message, so as to instruct the base station to calculate the paging time by using the extended DRX and deliver the paging message at the paging time. It should be noted that, the extended DRX indicator may be a low power indicator, may be a low priority indicator, or may be an extended paging priority indicator or a DRX type indicator, similarly, the terminal also calculates the paging time by using the extended DRX. In this embodiment, in an LTE system, the base station is corresponding to an eNB, and the network element of the core network is corresponding to an MME, in a UMTS system, the base station is corresponding to an RNC, and the network element of the core network is corresponding to an SGSN or an MSC, and for a GERAN, the base station is corresponding to a BSC, and the network element of the core network is corresponding to an SGSN or an MSC.

In the method provided in this embodiment, a terminal reports an extended DRX indicator or extended DRX to a network element of a core network, so that the network element of the core network adds the extended DRX indicator and/or the extended DRX to a paging message delivered to a base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 9, before the calculating a paging time by using the extended DRX, preferably, the method further includes receiving the extended DRX notified by broadcasting by the base station, and reporting the extended DRX indicator to the network element of the core network.

Specifically, the base station may broadcast the extended DRX. Optionally, there may be two specific implementation manners, which are as follows.

A first implementation manner is when broadcasting the extended DRX, the base station may consider whether the network element of the core network supports the extended DRX, that is, when the network element of the core network supports the extended DRX, and notifies the base station of that by using singling or OA&M, or statically configures that on the base station, and when the base station also supports the extended DRX, the base station broadcasts specific extended DRX. After the terminal receives the extended DRX that is broadcast, if the terminal needs to enable the extended DRX, the terminal sends an NAS request message to the network element of the core network, where the request message may be an attachment request, an RAU request message, or a TAU request message, and the NAS request message sent to the network element of the core network carries the extended DRX indicator, so that the network element of the core network learns that the terminal uses the extended DRX, the network element of the core network records the indicator and adds the extended DRX indicator to the paging message delivered to the base station, so as to instruct the base station to use the extended DRX, and after receiving the extended DRX indicator carried in the paging message, the base station calculates the paging time by using an extended DRX value broadcast by the base station, similarly, the terminal also calculates the paging time by using the extended DRX value broadcast by the base station. It should be noted that, the extended DRX indicator reported by the terminal to the network element of the core network or the extended DRX indicator carried in the paging message delivered by the network element of the core network to the base station may be a low power indicator, or may be a low priority indicator.

A second implementation manner is when broadcasting the extended DRX, the base station may directly broadcast specific extended DRX when the base station supports a capability of the extended DRX, regardless of whether the network element of the core network supports the extended DRX. The terminal receives the extended DRX broadcast by the base station, and then, refer to the processing process in the first implementation manner.

In the method provided in this embodiment, a base station broadcasts specific extended DRX, after receiving the extended DRX, a terminal reports, to a network element of a core network, that an extended DRX indicator is used, the network element of the core network delivers a paging message and adds the extended DRX indicator to the paging message, so as to enable the base station to calculate a paging time by using the extended DRX, and similarly, the terminal calculates the paging time by using the extended DRX and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 9, preferably, the reporting an extended DRX indicator or extended DRX to a network element of a core network may be receiving whether the base station supports a capability of the extended DRX, which is notified by broadcasting by the base station, and when the base station supports the capability of the extended DRX, reporting the extended DRX to the network element of the core network.

Specifically, the base station broadcasts, in a system message, whether the base station supports the capability of the extended DRX, so that the terminal learns whether the base station, to which the terminal belongs, supports the extended DRX. If the base station, to which the terminal belongs, broadcasts that the capability of the extended DRX is supported, the terminal sends an NAS request message to the network element of the core network after receiving the broadcast indicator, where the request message may be an attachment request, an RAU request message, or a TAU request message, and the NAS request message carries an extended DRX value, the network element of the core network records the extended DRX value, adds the extended DRX value to a paging message and delivers to the base station, after receiving the extended DRX value carried in the paging message, the base station calculates the paging time by using the extended DRX value, similarly, the terminal also calculates the paging time by using the reported extended DRX. If the base station, to which the terminal belongs, broadcasts that the capability of the extended DRX is not supported, processing is performed as in the prior art.

In the method provided in this embodiment, a base station broadcasts whether a capability of extended DRX is supported, and on a premise that the base station supports the capability of the extended DRX, the base station broadcasts that the capability of the extended DRX is supported, after receiving an indicator broadcast by the base station, a terminal reports, to a network element of a core network, that the extended DRX is used, the network element of the core network delivers a paging message to the base station and adds the extended DRX to the paging message, so as to enable the base station to calculate a paging time by using the extended DRX, and similarly, the terminal calculates the paging time by using the extended DRX and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 9, more preferably, the reporting an extended DRX indicator or extended DRX to a network element of a core network may be receiving that a capability of the extended DRX is supported, which is notified by broadcasting by the base station when both the base station and the network element of the core network support the capability of the extended DRX, and reporting the extended DRX to the network element of the core network.

Specifically, when broadcasting that the extended DRX is supported, the base station needs to consider a capability of the core network, and when the network element of the core network supports the extended DRX, and notifies the base station of that by using singling or OA&M, or statically configures that on the base station, and only when both the core network and the base station support the capability of the extended DRX, the base station broadcasts that the capability of the extended DRX is supported. The terminal sends an NAS request message to the network element of the core network after receiving the broadcast indicator, where the request message may be an attachment request, an RAU request message, or a TAU request message, and the NAS request message carries an extended DRX value, the network element of the core network records the extended DRX value, adds the extended DRX value to a paging message, and delivers to the base station, after receiving the extended DRX value carried in the paging message, the base station calculates the paging time by using the extended DRX value, and similarly, the terminal also calculates the paging time by using the reported extended DRX value.

In the method provided in this embodiment, when both a base station and a network element of a core network support a capability of extended DRX, the base station broadcasts that the capability of the extended DRX is supported, after receiving an indicator broadcast by the base station, a terminal reports, to the network element of the core network, that extended DRX is used, the network element of the core network delivers a paging message to the base station and adds the extended DRX to the paging message, so as to enable the base station to calculate a paging time by using the extended DRX, and similarly, the terminal calculates the paging time by using the extended DRX, and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

In another embodiment of the present invention, based on the foregoing embodiment 9, preferably, the reporting an extended DRX indicator or extended DRX to a network element of a core network may be reporting non-extended DRX or the extended DRX to the network element of the core network, receiving whether the network element of the core network supports a capability of the extended DRX, and when the network element of the core network supports the capability of the extended DRX, reporting the extended DRX to the network element of the core network.

Specifically, the terminal sends an NAS request message to the network element of the core network, where the request message may be an attachment request or an RAU request message or a TAU request message, and the NAS request message carries an extended DRX value or a non-extended DRX value, the network element of the core network receives the NAS request message sent by the terminal and sends a reception message to the terminal, where an extended DRX support indicator is carried in the reception message, for example, the extended DRX support indicator is carried in an attachment reception NAS message to indicate that the network element, to which the terminal belongs, of the core network supports the extended DRX, after the terminal receives the indicator, if the terminal reports the non-extended DRX last time, the terminal sends a TAU request message or an RAU request message to update the DRX to be extended DRX, and reports the extended DRX to the network element of the core network, so that the network element of the core network adds the extended DRX to the paging message delivered to the base station, so as to enable the base station to calculate the paging time by using the extended DRX, if the network element of the core network does not support the capability of the extended DRX, and if the terminal reports extended DRX last time, the terminal sends a TAU request message or an RAU request message to update the DRX to be non-extended DRX, and reports the non-extended DRX to the network element of the core network, so that the network element of the core network adds the non-extended DRX to the paging message delivered to the base station, so that processing is performed according to the prior art.

In the method provided in this embodiment, a network element of a core network notifies, by sending a reception message to a terminal, the terminal whether the network element, to which the terminal belongs, of the core network supports extended DRX, and updates DRX reported by the terminal, that is, in a case in which the terminal reports non-extended DRX to the network element of the core network but the network element of the core network supports the extended DRX, updates the non-extended DRX to be extended DRX, so that the network element of the core network adds the extended DRX to a paging message delivered to a base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and extended DRX in the paging message to use only the default DRX, and also avoiding a paging loss caused by that DRX between the terminal and the network is asynchronous.

Figure 4:
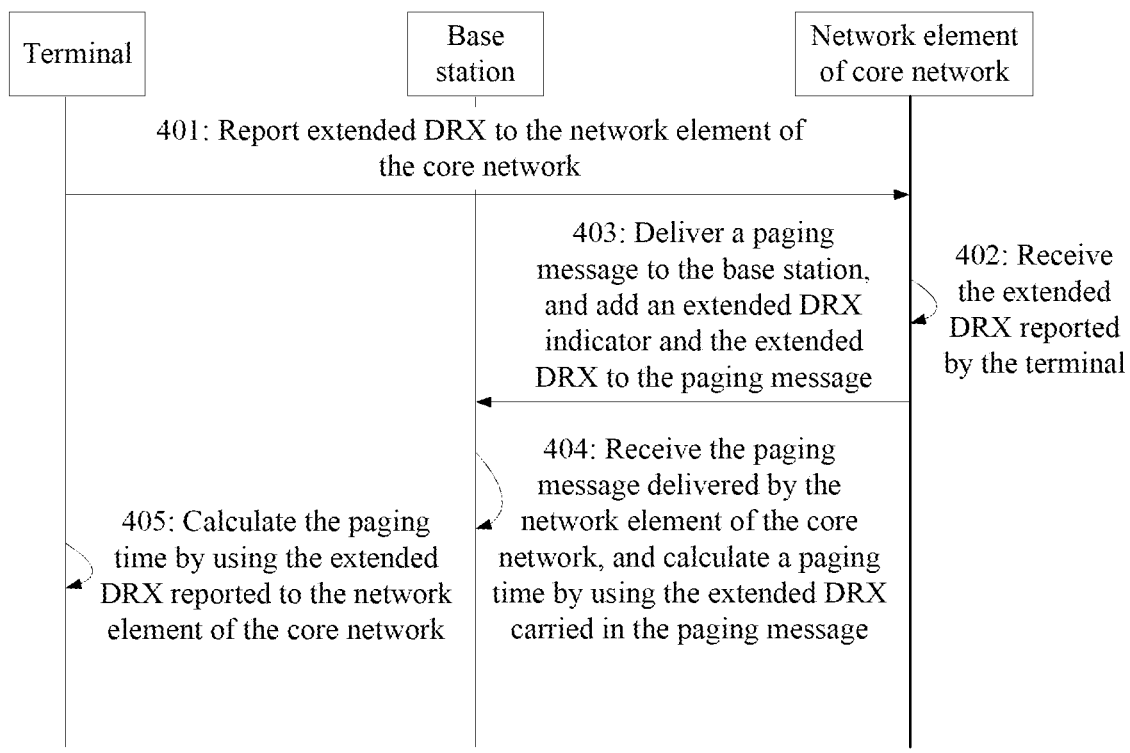
FIG. 4 is a schematic flowchart of another embodiment of a discontinuous reception communication synchronization method according to the present invention.

FIG. 4 is a schematic flowchart of another embodiment of a discontinuous reception communication synchronization method according to the present invention. The method in this embodiment is executed by a discontinuous reception communication synchronization apparatus, and the method in this embodiment includes the following steps.

S401: A terminal reports an extended DRX to a network element of a core network.

S402: The network element of the core network receives the extended DRX reported by the terminal.

S403: The network element of the core network delivers a paging message to a base station, and adds an extended DRX indicator and the extended DRX to the paging message.

Specifically, the terminal sends an NAS request message to the network element of the core network, where the request message may be an attachment request, an RAU request message, or a TAU request message, and the NAS request message carries the extended DRX value. Then, the network element of the core network receives the extended DRX reported by the terminal, and records the extended DRX value in context. When the network element of the core network receives a downlink service of the terminal and needs to trigger paging, the network element of the core network delivers the paging message to the base station, and adds the extended DRX indicator and the extended DRX to the paging message.

S404: The base station receives the paging message delivered by the network element of the core network, and calculates a paging time by using the extended DRX carried in the paging message.

S405: The terminal calculates the paging time by using the extended DRX reported to the network element of the core network.

Specifically, the base station receives the paging message delivered by the network element of the core network, and calculates the paging time by using the extended DRX according to the extended DRX indicator in the paging message, where the extended DRX indicator may be a single cell, or an extended paging priority that instructs by using a paging priority, or a specific DRX type to instruct the base station. Similarly, the terminal also calculates the paging time by using the extended DRX reported to the network element of the core network, and receives paging delivered by the base station when the paging time arrives.

In the method provided in this embodiment, a terminal reports extended DRX to a network element of a core network, the network element of the core network delivers a paging message to a base station and adds the extended DRX and an extended DRX indicator to the paging message, so as to enable the base station to calculate a paging time by using the extended DRX, and similarly, the terminal calculates the paging time by using the extended DRX and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 5:
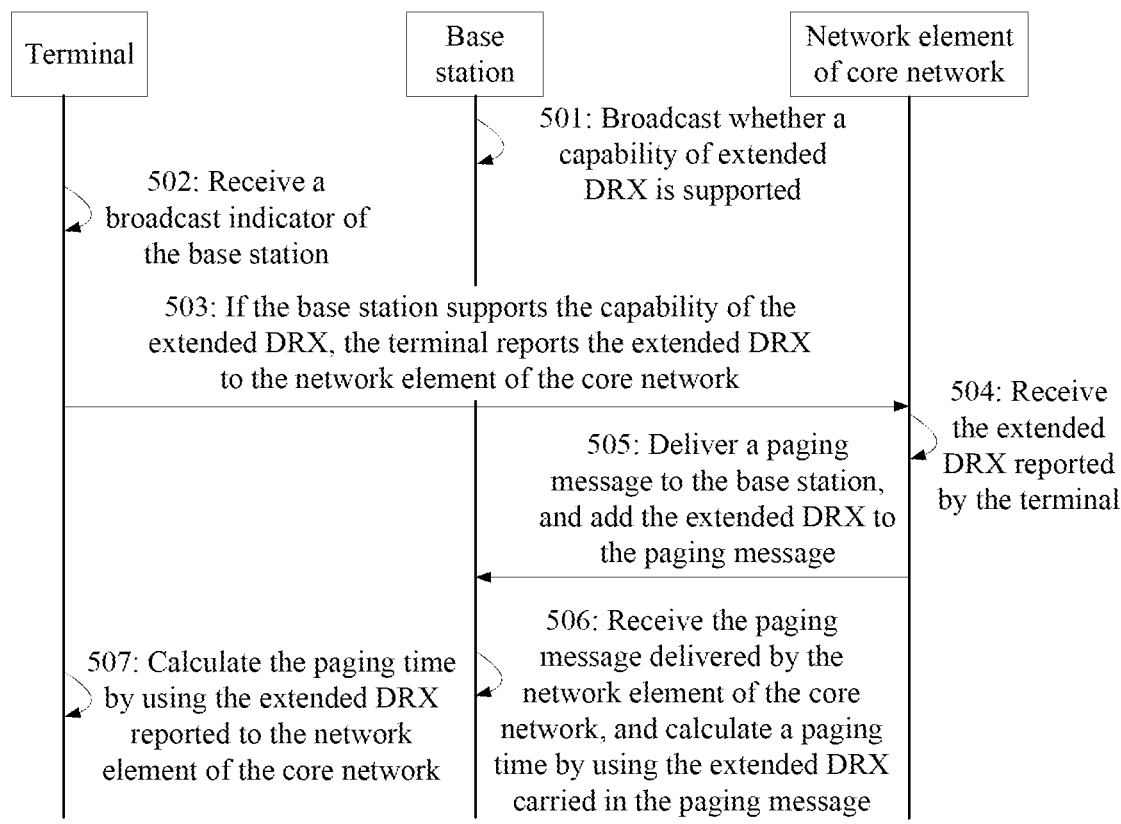
FIG. 5 is a schematic flowchart of another embodiment of a discontinuous reception communication synchronization method according to the present invention.

FIG. 5 is a schematic flowchart of another embodiment of a discontinuous reception communication synchronization method according to the present invention. The method in this embodiment is executed by a discontinuous reception communication synchronization apparatus, and the method in this embodiment includes the following steps.

S501: A base station broadcasts whether a capability of an extended DRX is supported.

S502: A terminal receives a broadcast indicator of the base station.

S503: If the base station supports the capability of the extended DRX, the terminal reports the extended DRX to a network element of a core network.

S504: The network element of the core network receives the extended DRX reported by the terminal.

Specifically, the base station broadcasts, in a system message, whether the base station supports the capability of the extended DRX, so that the terminal learns whether the extended DRX is supported. If the base station, to which the terminal belongs, broadcasts that the capability of the extended DRX is supported, the terminal sends an NAS request message to the network element of the core network after receiving the broadcast indicator, where the request message may be an attachment request, an RAU request message, or a TAU request message, and the NAS request message carries an extended DRX value, and the network element of the core network receives the extended DRX reported by the terminal and records the extended DRX value in context, if the base station, to which the terminal belongs, does not support the extended DRX, the terminal reports non-extended DRX to the network element of the core network, and processing is performed according to the prior art.

S505: The network element of the core network delivers a paging message to the base station, and adds the extended DRX to the paging message.

S506: The base station receives the paging message delivered by the network element of the core network, and calculates a paging time by using the extended DRX carried in the paging message.

S507: The terminal calculates the paging time by using the extended DRX reported to the network element of the core network.

Specifically, when the network element of the core network receives a downlink service of the terminal and needs to trigger paging, the network element of the core network delivers the paging message to the base station, and adds the extended DRX to the paging message, the base station receives the paging message delivered by the network element of the core network, and calculates the paging time by using the extended DRX carried in the paging message, and similarly, the terminal also calculates the paging time by using the reported extended DRX value. It should be noted that, when the terminal moves from an area supporting the extended DRX to a coverage area that does not support the extended DRX, the terminal needs to execute an RAU process or a TAU process to report an updated DRX value to the network element of the core network.

In the method provided in this embodiment, a base station broadcasts whether a capability of the extended DRX is supported, on a premise that the base station supports the capability of the extended DRX, after receiving an indicator broadcast by the base station, a terminal reports, to a network element of a core network, that the extended DRX is used, the network element of the core network delivers a paging message to the base station and adds the extended DRX to the paging message, so as to enable the base station to calculate a paging time by using the extended DRX, and similarly, the terminal calculates the paging time by using the extended DRX and receives, at the paging time, the paging message delivered by the base station at the paging time, thereby overcoming extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 6:
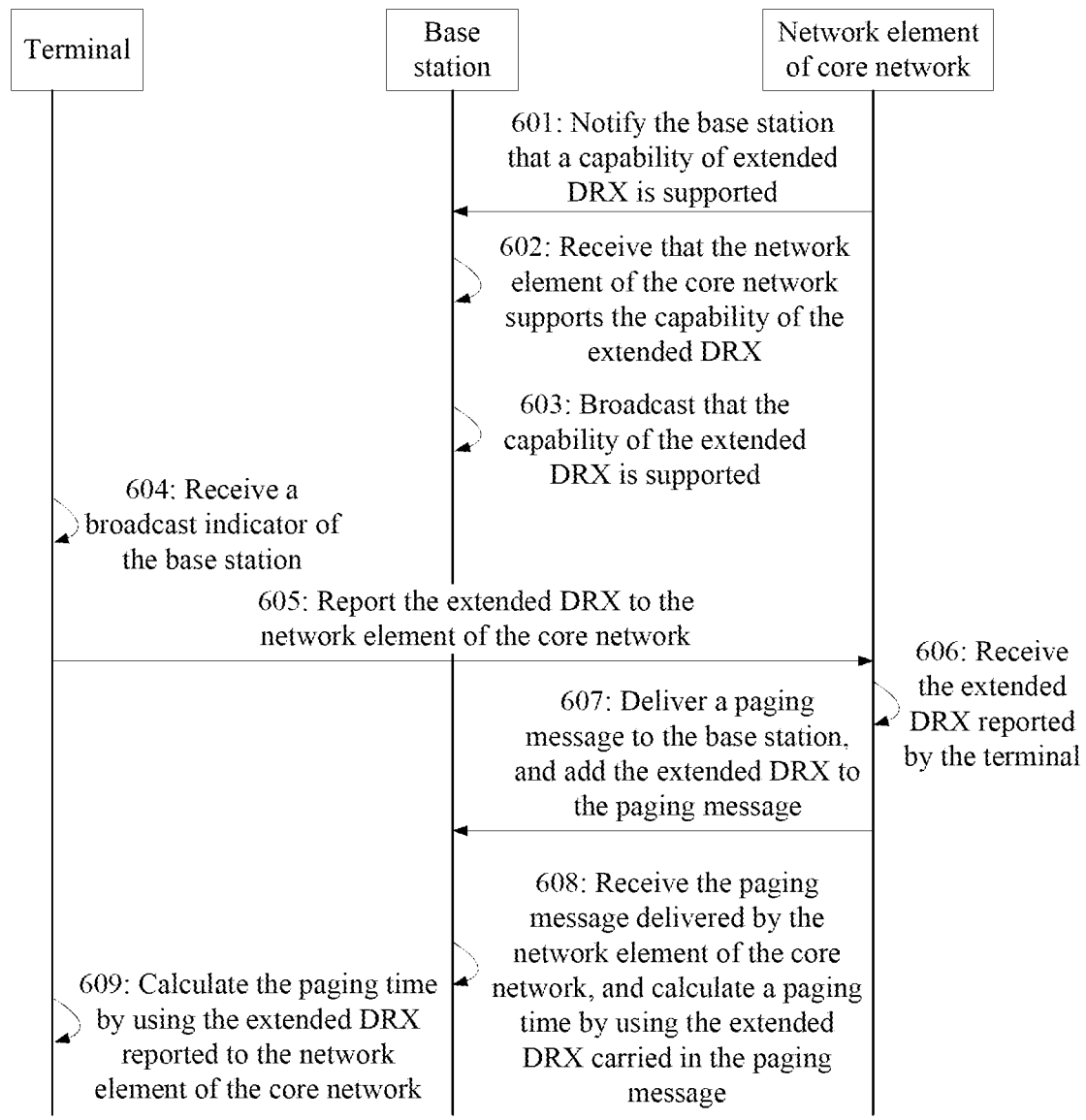
FIG. 6 is a schematic flowchart of another embodiment of a discontinuous reception communication synchronization method according to the present invention.

FIG. 6 is a schematic flowchart of another embodiment of a discontinuous reception communication synchronization method according to the present invention. The method in this embodiment is executed by a discontinuous reception communication synchronization apparatus, and the method in this embodiment includes the following steps.

S601: A network element of a core network notifies a base station that a capability of an extended DRX is supported.

S602: The base station receives that the network element of the core network supports the capability of the extended DRX.

S603: The base station broadcasts that the capability of the extended DRX is supported.

Specifically, the network element of the core network notifies, in a singling or OA&M manner, the base station that the network element of the core network supports the capability of the extended DRX, or statically configures, on the base station, that the network element of the core network supports the capability of the extended DRX, and the base station receives that the network element of the core network supports the capability of the extended DRX. When both the base station and the core network support the capability of the extended DRX, that the capability of the extended DRX is supported is broadcast in a system message.

S604: A terminal receives a broadcast indicator of the base station.

S605: The terminal reports the extended DRX to the network element of the core network.

S606: The network element of the core network receives the extended DRX reported by the terminal.

S607: The network element of the core network delivers a paging message to the base station, and adds the extended DRX to the paging message.

S608: The base station receives the paging message delivered by the network element of the core network, and calculates a paging time by using the extended DRX carried in the paging message.

S609: The terminal calculates the paging time by using the extended DRX reported to the network element of the core network.

Specifically, the terminal sends an NAS request message to the network element of the core network after receiving the broadcast indicator of the base station, where the request message may be an attachment request, an RAU request message, or a TAU request message, and the NAS request message carries an extended DRX value, the network element of the core network records the extended DRX value, adds the extended DRX value to the paging message, and delivers to the base station, after receiving the extended DRX value carried in the paging message, the base station calculates the paging time by using the extended DRX value, and similarly, the terminal also calculates the paging time by using the extended DRX value that is broadcast by the base station.

In the method provided in this embodiment, on a premise that both a base station and a network element of a core network support a capability of extended DRX, the base station broadcasts that the capability of the extended DRX is supported, after receiving an indicator broadcast by the base station, a terminal reports, to the network element of the core network, that the extended DRX is used, the network element of the core network delivers a paging message to the base station and adds the extended DRX to the paging message, so as to enable the base station to calculate a paging time by using the extended DRX, and similarly, the terminal calculates the paging time by using the extended DRX, and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 7:
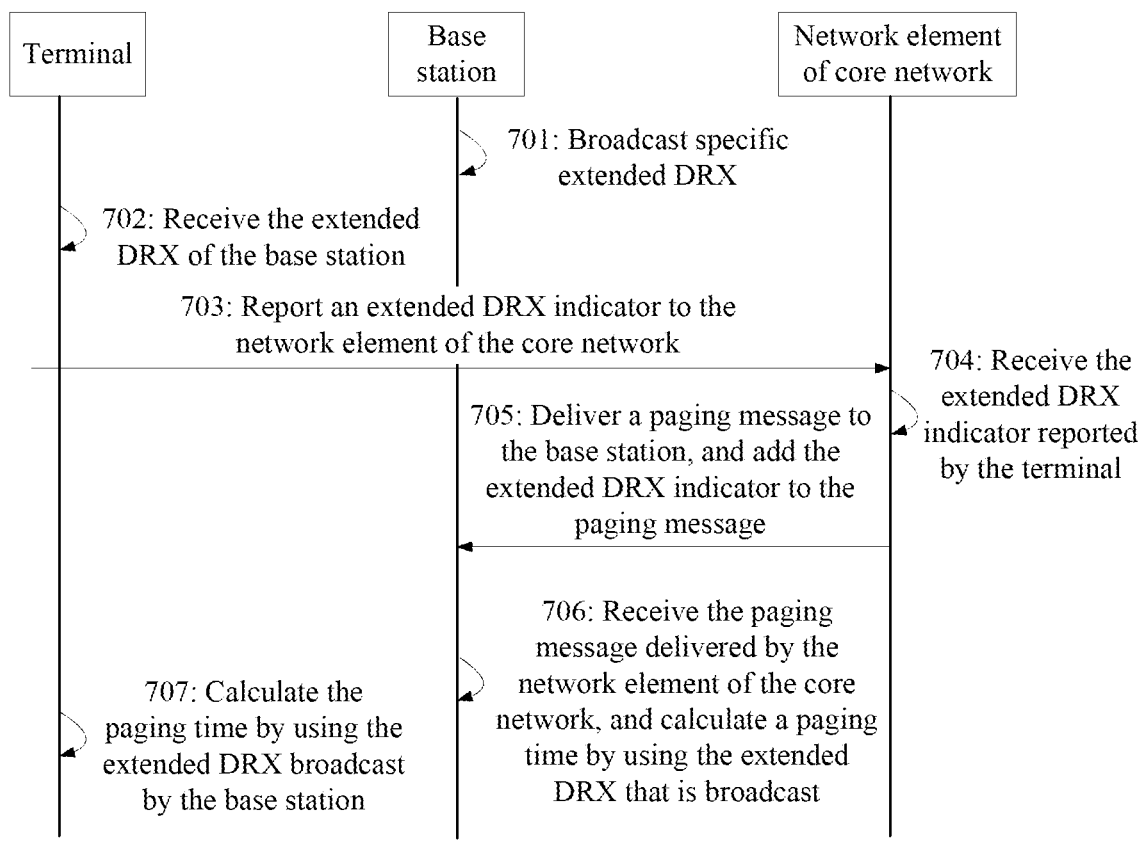
FIG. 7 is a schematic flowchart of another embodiment of a discontinuous reception communication synchronization method according to the present invention.

FIG. 7 is a schematic flowchart of another embodiment of a discontinuous reception communication synchronization method according to the present invention. The method in this embodiment is executed by a discontinuous reception communication synchronization apparatus, and the method in this embodiment includes the following steps.

S701: A base station broadcasts a specific extended DRX.

Specifically, that a base station broadcasts that the specific extended DRX may have two situations, that is, a first situation is the base station may not consider whether a network element of a core network supports a capability of the extended DRX, and the base station directly broadcasts the specific extended DRX in only a case in which the base station supports the capability of the extended DRX, and a second situation is the base station may consider whether the network element of the core network supports the capability of the extended DRX, which specifically is that the network element of the core network notifies, in a singling or OA&M manner, the base station that the network element of the core network supports the capability of the extended DRX, or statically configures, on the base station, that the network element of the core network supports the capability of the extended DRX, and the base station receives that the network element of the core network supports the capability of the extended DRX, and broadcasts, in a system message, the specific extended DRX when both the base station and the core network support the capability of the extended DRX.

S702: A terminal receives the extended DRX of the base station.

S703: The terminal reports an extended DRX indicator to a network element of a core network.

S704: The network element of the core network receives the extended DRX indicator reported by the terminal.

S705: The network element of the core network delivers a paging message to the base station, and adds the extended DRX indicator to the paging message.

S706: The base station receives the paging message delivered by the network element of the core network, and calculates a paging time by using the extended DRX that is broadcast.

S707: The terminal calculates the paging time by using the extended DRX broadcast by the base station.

Specifically, after receiving the specific extended DRX broadcast by the base station, the terminal sends an NAS request message to the network element of the core network, where the request message may be an attachment request, an RAU request message, or a TAU request message, the NAS request message carries the extended DRX indicator, and the indicator may be a lower power indicator or a low priority indicator, the network element of the core network records the extended DRX indicator, adds the extended DRX indicator to the paging message, and delivers to the base station, after receiving the extended DRX indicator carried in the paging message, the base station calculates the paging time by using the extended DRX value, and similarly, the terminal also calculates the paging time by using the extended DRX value broadcast by the base station.

In the method provided in this embodiment, a base station broadcasts specific extended DRX, after receiving the extended DRX, a terminal reports, to a network element of a core network, that an extended DRX indicator is used, the network element of the core network delivers a paging message and adds the extended DRX indicator to the paging message, so as to enable the base station to calculate a paging time by using the extended DRX, and similarly, the terminal calculates the paging time by using the extended DRX and receives, at the paging time, the paging message delivered by the base station at the paging time, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Figure 8:
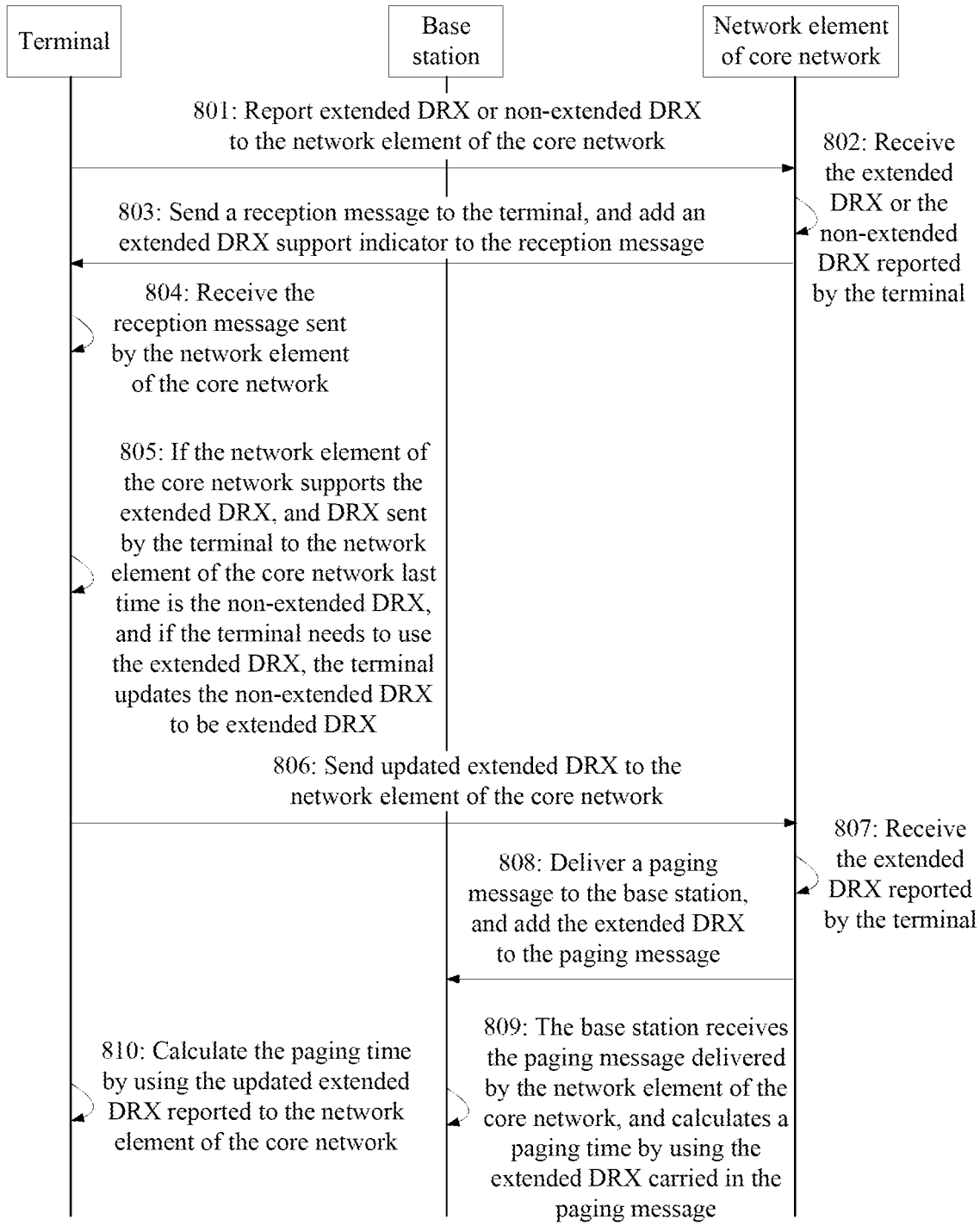
FIG. 8 is a schematic flowchart of another embodiment of a discontinuous reception communication synchronization method according to the present invention.

FIG. 8 is a schematic flowchart of another embodiment of a discontinuous reception communication synchronization method according to the present invention. The method in this embodiment is executed by a discontinuous reception communication synchronization apparatus, and the method in this embodiment includes the following steps.

S801: A terminal reports an extended DRX or a non-extended DRX to a network element of a core network.

S802: The network element of the core network receives the extended DRX or the non-extended DRX reported by the terminal.

S803: The network element of the core network sends a reception message to the terminal, and adds an extended DRX support indicator to the reception message.

Specifically, the terminal sends an NAS request message to the network element of the core network, where the request message may be an attachment request, an RAU request message, or a TAU request message, and the NAS request message carries the extended DRX or the non-extended DRX, the network element of the core network receives the NAS request message sent by the terminal and sends the reception message to the terminal, where the extended DRX support indicator is carried in the reception message, for example, the extended DRX support indicator is carried in an attachment reception NAS message to indicate that the network element, to which the terminal belongs, of the core network supports the extended DRX.

S804: The terminal receives the reception message sent by the network element of the core network.

S805: If the network element of the core network supports the extended DRX, and DRX sent last time by the terminal to the network element of the core network is the non-extended DRX, and if the terminal needs to use the extended DRX, the terminal updates the non-extended DRX to be extended DRX.

S806: The terminal sends updated extended DRX to the network element of the core network.

S807: The network element of the core network receives the extended DRX reported by the terminal.

S808: The network element of the core network delivers a paging message to a base station, and adds the extended DRX to the paging message.

S809: The base station receives the paging message delivered by the network element of the core network, and calculates a paging time by using the extended DRX carried in the paging message.

S810: The terminal calculates the paging time by using the updated extended DRX reported to the network element of the core network.

After the terminal receives the reception message of the network element of the core network, if the network element of the core network supports the extended DRX, and the terminal reports non-extended DRX last time, the terminal sends a TAU request message or an RAU request message to update the DRX to be extended DRX, and reports the extended DRX to the network element of the core network, so that the network element of the core network adds the extended DRX to the paging message delivered to the base station, so as to enable the base station to calculate the paging time by using the extended DRX, and the terminal also calculates the paging time by using the updated extended DRX reported to the network element of the core network, if the network element of the core network does not support a capability of the extended DRX, and if the terminal reports extended DRX last time, the terminal sends a TAU request message or an RAU request message to update the DRX to be non-extended DRX, and reports the non-extended DRX to the network element of the core network, so that the network element of the core network adds the non-extended DRX to the paging message delivered to the base station, so that processing is performed according to the prior art.

In the method provided in this embodiment, a network element of a core network notifies, by sending a reception message to a terminal, the terminal whether the network element, to which the terminal belongs, of the core network supports extended DRX, and updates DRX reported by the terminal, that is, in a case in which the terminal reports non-extended DRX to the network element of the core network but the network element of the core network supports the extended DRX, updates the non-extended DRX to be extended DRX, so that the network element of the core network adds the extended DRX to a paging message delivered to a base station, so as to instruct the base station to calculate a paging time by using the extended DRX, thereby overcoming a problem of extra power consumption caused by that the terminal frequently listens to a paging message during a process of communicating with a network due to that in the prior art, the base station selects a smaller one between default DRX that is broadcast and DRX in the paging message, and also avoiding a paging loss caused by that DRX between the terminal and the network is asynchronous.

Persons of ordinary skill in the art may understand all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes any medium that can store program code, such as a ROM, RAM, a magnetic disk, or an optical disc.

Figure 9:
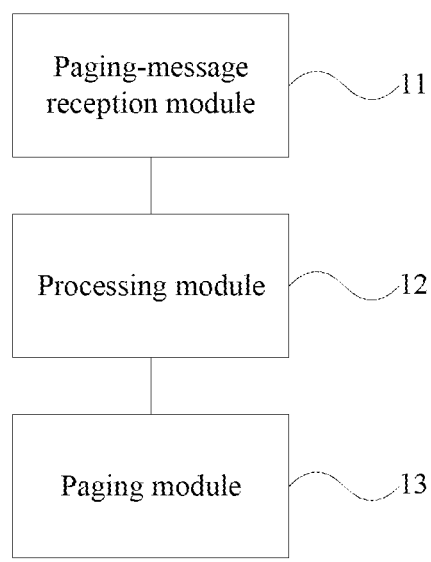
FIG. 9 is a schematic structural diagram of an embodiment of a discontinuous reception communication synchronization apparatus according to the present invention.

FIG. 9 is a schematic structural diagram of an embodiment of a discontinuous reception communication synchronization apparatus according to the present invention. As shown in FIG. 9, the apparatus includes a paging-message reception module 11, a processing module 12, and a paging module 13, where the paging-message reception module 11 is configured to receive a paging message delivered by a network element of a core network, where the paging message includes an extended discontinuous reception DRX indicator and/or extended DRX, the processing module 12 is configured to calculate a paging time according to the extended discontinuous reception DRX indicator and/or the extended DRX received by the paging-message reception module, and the paging module 13 is configured to page a terminal at the paging time that is calculated by the processing module.

The discontinuous reception communication synchronization apparatus in this embodiment may execute the foregoing discontinuous reception communication synchronization method embodiments, where an implementation principle and a technical effect are similar, and no detail is repeatedly described herein.

Figure 10:
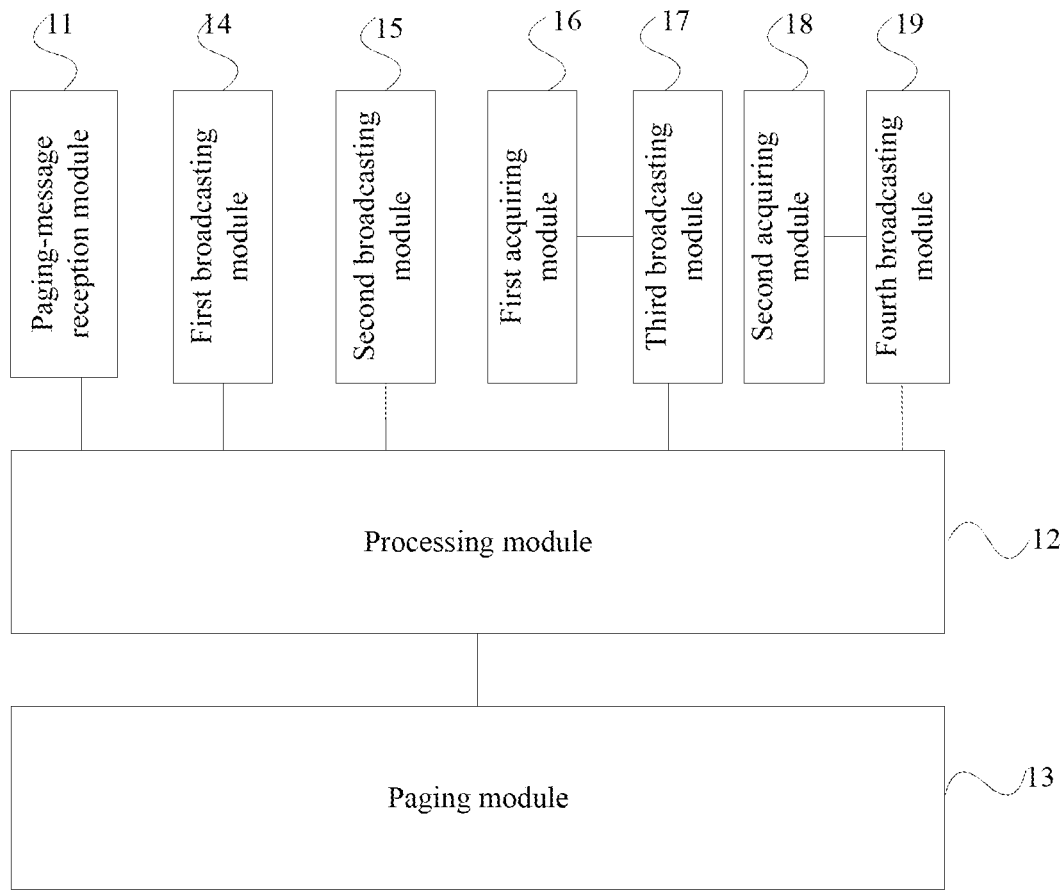
FIG. 10 is a schematic structural diagram of another embodiment of a discontinuous reception communication synchronization apparatus according to the present invention.

FIG. 10 is a schematic structural diagram of another embodiment of a discontinuous reception communication synchronization apparatus according to the present invention. Based on the embodiment shown in FIG. 9, the apparatus may further include a first broadcasting module 14, configured to notify the terminal of the extended DRX by broadcasting before the processing module calculates the paging time.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 10, the apparatus may further includes a second broadcasting module 15, configured to notify, by broadcasting before the processing module calculates the paging time, the terminal whether a base station, to which the terminal belongs, supports a capability of the extended DRX.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 10, the apparatus may further include a first acquiring module 16, configured to acquire, before the processing module calculates the paging time, whether the network element of the core network supports a capability of the extended DRX, and a third broadcasting module 17, configured to notify the terminal of the extended DRX by broadcasting when both a base station and the network element of the core network support the extended DRX.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 10, the apparatus may further include a second acquiring module 18, configured to acquire, before the processing module calculates the paging time, whether the network element of the core network supports the capability of the extended DRX, and a fourth broadcasting module 19, configured to notify, by broadcasting when both the base station to which the terminal belongs and the network element of the core network support the capability of the extended DRX, the terminal that the capability of the extended DRX is supported.

The discontinuous reception communication synchronization apparatus in this embodiment may execute the foregoing discontinuous reception communication synchronization method embodiments, where an implementation principle and a technical effect are similar, and no detail is repeatedly described herein.

Figure 11:
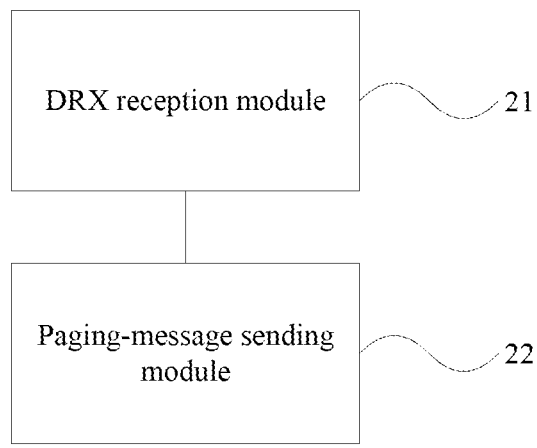
FIG. 11 is a schematic structural diagram of another embodiment of a discontinuous reception communication synchronization apparatus according to the present invention.

FIG. 11 is a schematic structural diagram of another embodiment of a discontinuous reception communication synchronization apparatus according to the present invention. As shown in FIG. 11, the apparatus includes a DRX reception module 21 and a paging-message sending module 22, where the DRX reception module 21 is configured to receive extended discontinuous reception DRX or an extended DRX indicator reported by a terminal, and the paging-message sending module 22 is configured to deliver a paging message to a base station when a downlink service of the terminal is detected, where the paging message carries the extended discontinuous reception indicator and/or the extended DRX received by the DRX reception module, so as to instruct the base station to calculate a paging time by using the extended DRX.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 11, the apparatus may further include a capability notification module 23, configured to, before the DRX reception module receives the extended DRX or the extended DRX indicator reported by the terminal, notify, by using signaling or an operation, administration and maintenance system, the base station whether a network element, to which the terminal belongs, of a core network supports a capability of the extended DRX, or statically configure, on the base station, whether a network element, to which the terminal belongs, of a core network supports a capability of the extended DRX, so as to instruct the base station to notify the terminal by broadcasting.

The discontinuous reception communication synchronization apparatus in this embodiment may execute the foregoing discontinuous reception communication synchronization method embodiments, where an implementation principle and a technical effect are similar, and no detail is repeatedly described herein.

Figure 12:
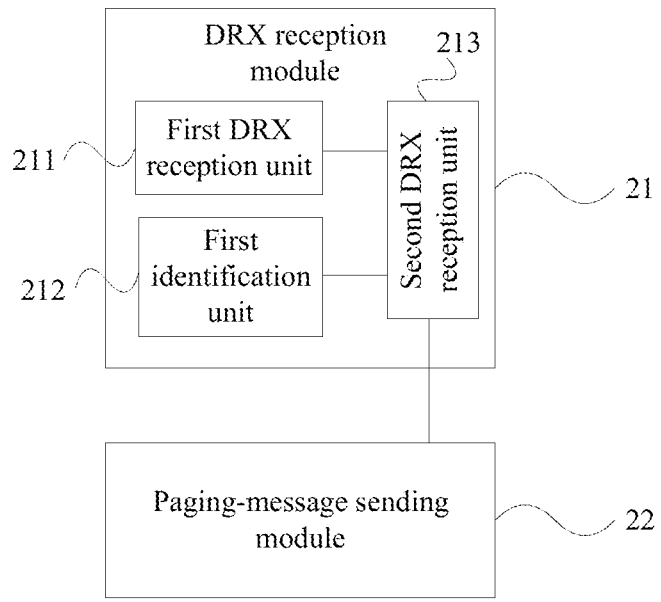
FIG. 12 is a schematic structural diagram of another embodiment of a discontinuous reception communication synchronization apparatus according to the present invention.

FIG. 12 is a schematic structural diagram of another embodiment of a discontinuous reception communication synchronization apparatus according to the present invention. Based on the embodiment shown in FIG. 11, the foregoing DRX reception module 21 may further include a first DRX reception unit 211, configured to receive non-extended DRX or the extended DRX reported by the terminal, a first identification unit 212, configured to when it is identified that a network element, to which the terminal belongs, of a core network supports a capability of the extended DRX, notify the terminal that the network element, to which the terminal belongs, of the core network supports the capability of the extended DRX, and a second DRX reception unit 213, configured to receive the extended DRX received by the first DRX reception unit when the terminal enables the extended DRX.

The discontinuous reception communication synchronization apparatus in this embodiment may execute the foregoing discontinuous reception communication synchronization method embodiments, where an implementation principle and a technical effect are similar, and no detail is repeatedly described herein.

Figure 13:
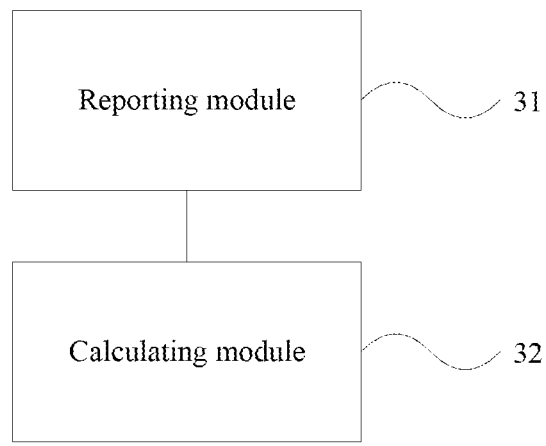
FIG. 13 is a schematic structural diagram of another embodiment of a discontinuous reception communication synchronization apparatus according to the present invention.

FIG. 13 is a schematic structural diagram of another embodiment of a discontinuous reception communication synchronization apparatus according to the present invention. As shown in FIG. 13, the apparatus includes a reporting module 31 and a calculating module 32, where the reporting module 31 is configured to report an extended discontinuous reception DRX indicator or extended DRX to a network element of a core network, and the calculating module 32 is configured to calculate a paging time by using the extended DRX reported by the reporting module.

The discontinuous reception communication synchronization apparatus in this embodiment may execute the foregoing discontinuous reception communication synchronization method embodiments, where an implementation principle and a technical effect are similar, and no detail is repeatedly described herein.

Figure 14:
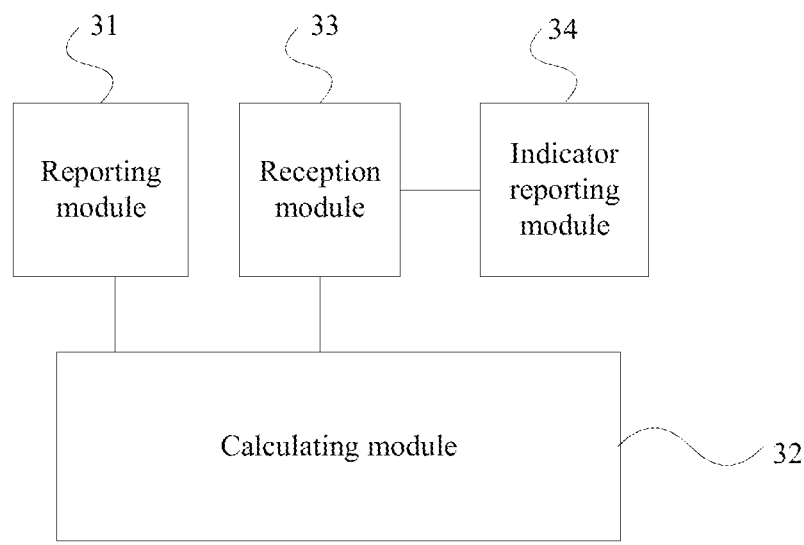
FIG. 14 is a schematic structural diagram of another embodiment of a discontinuous reception communication synchronization apparatus according to the present invention.

FIG. 14 is a schematic structural diagram of another embodiment of a discontinuous reception communication synchronization apparatus according to the present invention. Based on the embodiment shown in FIG. 13, the apparatus may further include a reception module 33, configured to receive, before the calculating module calculates the paging time by using the extended DRX, the extended DRX notified by broadcasting by the base station, and an indicator reporting module 34, configured to report the extended DRX indicator to the network element of the core network after the reception module receives the extended DRX.

The discontinuous reception communication synchronization apparatus in this embodiment may execute the foregoing discontinuous reception communication synchronization method embodiments, where an implementation principle and a technical effect are similar, and no detail is repeatedly described herein.

Figure 15:
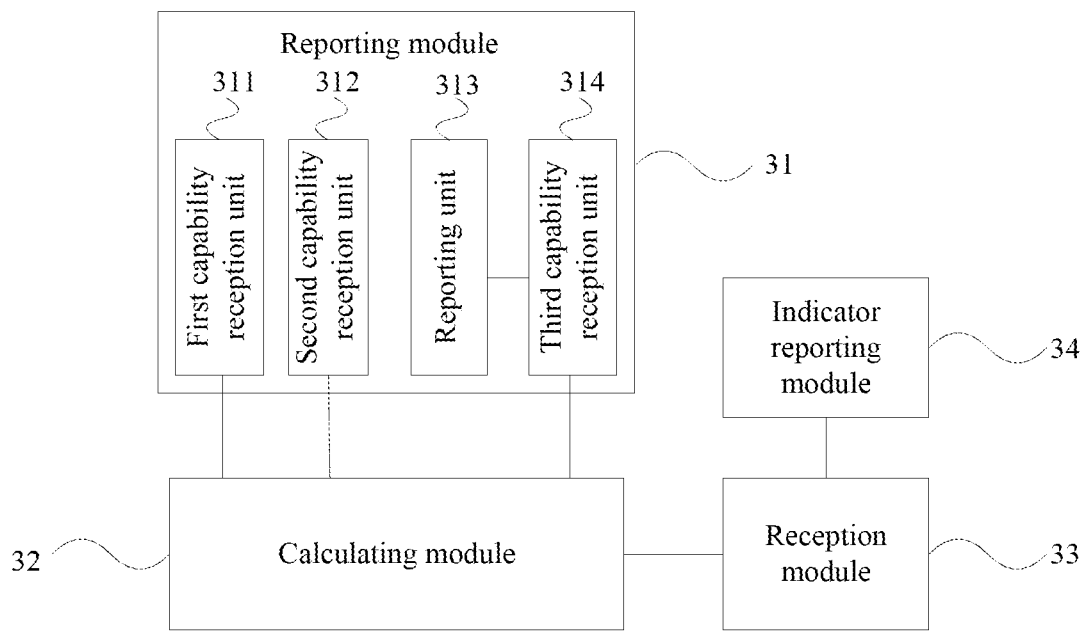
FIG. 15 is a schematic structural diagram of another embodiment of a discontinuous reception communication synchronization apparatus according to the present invention.

FIG. 15 is a schematic structural diagram of another embodiment of a discontinuous reception communication synchronization apparatus according to the present invention. Further, based on the foregoing embodiment shown in FIG. 14, the foregoing reporting module 31 may further include a first capability reception unit 311, configured to receive whether the base station supports a capability of the extended DRX, which is notified by broadcasting by the base station, and when the base station supports the capability of the extended DRX, report the extended DRX to the network element of the core network.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 14, the foregoing reporting module 31 may further include a second capability reception unit 312, configured to when both the base station and the network element of the core network support a capability of the extended DRX, receive that the capability of the extended DRX is supported, which is notified by broadcasting by the base station, and report the extended DRX to the network element of the core network.

The discontinuous reception communication synchronization apparatus in this embodiment may execute the foregoing discontinuous reception communication synchronization method embodiments, where an implementation principle and a technical effect are similar, and no detail is repeatedly described herein.

Further, based on the embodiment shown in FIG. 14, the foregoing reporting module 31 may further include a reporting unit 313, configured to report non-extended DRX or the extended DRX to the network element of the core network, and a third capability reception unit 314, configured to receive whether the network element of the core network supports a capability of the extended DRX, and when the network element of the core network supports the capability of the extended DRX, report the extended DRX to the network element of the core network.

The discontinuous reception communication synchronization apparatus in this embodiment may execute the foregoing discontinuous reception communication synchronization method embodiments, where an implementation principle and a technical effect are similar, and no detail is repeatedly described herein.

Figure 16:
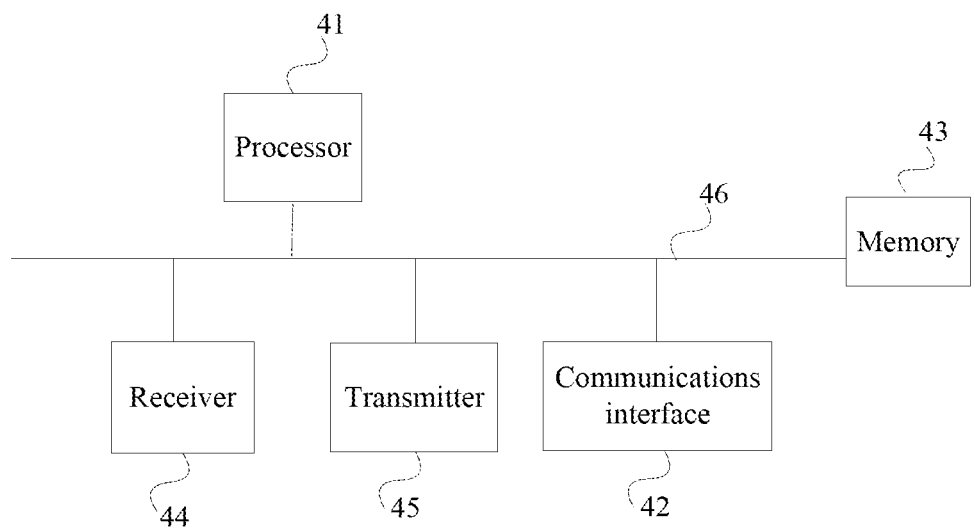
FIG. 16 is a schematic structural diagram of an embodiment of a base station according to the present invention.

FIG. 16 is a schematic structural diagram of an embodiment of a base station according to the present invention. No limitation is imposed on the specific implementation of the base station by any specific embodiment of the present invention. As shown in FIG. 16, the base station includes a processor 41, a communications interface 42, a memory 43, a receiver 44, a transmitter 45, and a bus 46.

The processor 41, the communications interface 42, the memory 43, the receiver 44, and the transmitter 45 communicate with each other by using the bus 46, the communications interface 42 is configured to communicate with another device, and the processor 41 is configured to run a program A.

Specifically, the program A may include program code, and the program code includes computer operation instructions.

The processor 41 may be a central processing unit CPU, or an application specific integrated circuit (ASIC), or may be configured as one or more integrated circuits that implement the embodiments of the present invention.

The memory 43 is configured to store the program A. The memory 43 may include a high-speed RAM memory, or may further include a non-volatile memory, for example, at least one magnetic disk memory. The program A may specifically include receiving a paging message delivered by a network element of a core network, according to an extended discontinuous reception DRX indicator and/or extended DRX in the paging message, calculating a paging time by using the extended DRX, and paging a terminal at the paging time.

Before the according to an extended DRX indicator and/or extended DRX in the paging message, calculating a paging time by using the extended DRX, preferably, the foregoing program A further configured to notify the terminal of the extended DRX by broadcasting.

Before the according to an extended DRX indicator and/or extended DRX in the paging message, calculating a paging time by using the extended DRX, preferably, the foregoing program A is further configured to acquire whether the network element of the core network supports a capability of the extended DRX, and when both a base station and the network element of the core network support the extended DRX, notifying the terminal of the extended DRX by broadcasting.

Preferably, the foregoing program A notifies, by broadcasting, the terminal whether the base station, to which the terminal belongs, supports the capability of the extended DRX.

Preferably, the foregoing program A acquires whether the network element of the core network supports the capability of the extended DRX, and when both the base station to which the terminal belongs and the network element of the core network support the capability of the extended DRX, notifying, by broadcasting, the terminal that the capability of the extended DRX is supported.

In an embodiment of a network element of a core network provided in the present invention, no limitation is imposed on the specific implementation of the network element of the core network by any specific embodiment of the present invention. Referring to FIG. 16, the network element of the core network also includes a processor, a communications interface, a memory, a receiver, a transmitter, and a bus.

The processor, the communications interface, the memory, the receiver, and the transmitter communicate with each other by using the bus, the communications interface is configured to communicate with another device, and the processor is configured to run a program B.

Specifically, the program B may include program code, and the program code includes computer operation instructions.

The processor may be a central processing unit CPU, or a specific integrated circuit ASIC, or may be configured as one or more integrated circuits that implement the embodiments of the present invention.

The memory is configured to store the program B. The memory may include a high-speed RAM memory, or may further include a non-volatile memory, for example, at least one magnetic disk memory. The program B may specifically configured to receive extended discontinuous reception DRX or an extended DRX indicator reported by a terminal, and deliver a paging message to a base station when a downlink service of the terminal is detected, where the paging message carries the extended DRX indicator and/or the extended DRX, so as to instruct the base station to calculate a paging time by using the extended DRX.

Preferably, the foregoing program B notifies, by using signaling or an operation, administration and maintenance system, the base station whether a network element, to which the terminal belongs, of a core network supports a capability of the extended DRX, or statically configuring, on the base station, whether a network element, to which the terminal belongs, of a core network supports a capability of the extended DRX, so as to instruct the base station to notify the terminal by broadcasting.

Preferably, the foregoing program B receives the non-extended DRX or the extended DRX reported by the terminal, when it is identified that the network element, to which the terminal belongs, of the core network supports the capability of the extended DRX, notifying the terminal that the network element, to which the terminal belongs, of the core network supports the capability of the extended DRX, and receiving the extended DRX reported by the terminal when the terminal enables the extended DRX.

In an embodiment of a terminal provided in the present invention, no limitation is imposed on specific implementation of the terminal by a specific embodiment of the present invention. Referring to FIG. 16, the terminal also includes a processor, a communications interface, a receiver, a transmitter, and a bus.

The processor, the communications interface, the memory, the receiver, and the transmitter communicate with each other by using the bus, the communications interface is configured to communicate with another device, and the processor is configured to run a program C.

Specifically, the program C may include program code, and the program code includes computer operation instructions.

The processor may be a central processing unit CPU, or a specific integrated circuit ASIC, or may be configured as one or more integrated circuits that implement the embodiments of the present invention.

The memory is configured to store the program C. The memory may include a high-speed RAM memory, or may further include a non-volatile memory, for example, at least one magnetic disk memory. The program C may specifically configured to report an extended discontinuous reception DRX indicator or extended DRX to a network element of a core network, and calculate a paging time by using the extended DRX.

Before the calculating a paging time by using the extended DRX, preferably, the foregoing program C further includes receiving the extended DRX notified by broadcasting by the base station, and reporting the extended DRX indicator to the network element of the core network.

In the foregoing program C, preferably, the reporting an extended DRX indicator or extended DRX to a network element of a core network includes receiving whether the base station supports a capability of the extended DRX, which is notified by broadcasting by the base station, and when the base station supports the capability of the extended DRX, reporting the extended DRX to the network element of the core network.

In the foregoing program C, preferably, the reporting an extended DRX indicator or extended DRX to a network element of a core network includes receiving that the capability of the extended DRX is supported, which is notified by broadcasting by the base station when both the base station and the network element of the core network support the capability of the extended DRX, and reporting the extended DRX to the network element of the core network.

In the foregoing program C, preferably, the reporting an extended DRX indicator or extended DRX to a network element of a core network includes reporting non-extended DRX or the extended DRX to the network element of the core network, receiving whether the network element of the core network supports the capability of the extended DRX, and when the network element of the core network supports the capability of the extended DRX, reporting the extended DRX to the network element of the core network.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. An apparatus, comprising:
   at least one processor; and
   a non-transitory computer-readable medium having a program stored thereon, the program comprising instructions which, when executed by the at least one processor, cause the apparatus to:
   receive a system message that is broadcast from a base station and that indicates that the base station supports a capability of extended discontinuous reception (DRX);
   send an extended DRX value to a network element of a core network;
   receive, from the network element of the core network, extended DRX support information indicating that the network element of the core network supports the extended DRX;
   calculate a paging time using the extended DRX value; and
   receive, according to the paging time, a paging message delivered from the base station.

2. The apparatus according to claim 1, wherein the instructions, when executed by the at least one processor, cause the apparatus to send a non-access stratum (NAS) request message to the network element of the core network, and wherein the NAS request message comprises the extended DRX value.

3. The apparatus according to claim 2, wherein the instructions, when executed by the at least one processor, cause the apparatus to receive, from the network element of the core network, a response message responsive to the NAS request message, and wherein the response message comprises the extended DRX support information.

4. The apparatus according to claim 3, wherein the response message is an attach accept message.

5. The apparatus according to claim 2, wherein the NAS request message is an attach request message.

6. The apparatus according to claim 1, wherein the apparatus is a terminal.

7. A method, comprising:
   receiving a system message that is broadcast from a base station and that indicates that the base station supports a capability of extended discontinuous reception (DRX);
   sending an extended DRX value to a network element of a core network;
   receiving, from the network element of the core network, extended DRX support information indicating that the network element of the core network supports the extended DRX;
   calculating a paging time using the extended DRX value; and
   receiving, according to the paging time, a paging message delivered from the base station.

8. The method according to claim 7, wherein sending the extended DRX value to the network element of the core network comprises:
   sending a non-access stratum (NAS) request message to the network element of the core network, wherein the NAS request message comprises the extended DRX value.

9. The method according to claim 8, wherein receiving, from the network element of the core network, the extended DRX support information comprises:
   receiving, from the network element of the core network, a response message responsive to the NAS request message, wherein the response message comprises the extended DRX support information.

10. The method according to claim 9, wherein the response message is an attach accept message.

11. The method according to claim 8, wherein the NAS request message is an attach request message.

12. A non-transitory computer-readable storage medium, storing instructions which, when executed by at least one processor, cause an apparatus comprising the at least one processor to:
   receive a system message that is broadcast from a base station and that indicates that the base station supports a capability of extended discontinuous reception (DRX);
   send an extended DRX value to a network element of a core network;
   receive, from the network element of the core network, extended DRX support information indicating that the network element of the core network supports the extended DRX;
   calculate a paging time using the extended DRX value; and
   receive, according to the paging time, a paging message delivered from the base station.

13. The non-transitory computer-readable storage medium according to claim 12, wherein the instructions, when executed by the at least one processor, cause the apparatus to send a non-access stratum (NAS) request message to the network element of the core network, and wherein the NAS request message comprises the extended DRX value.

14. The non-transitory computer-readable storage medium according to claim 13, wherein the instructions, when executed by the at least one processor, cause the apparatus to receive, from the network element of the core network, a response message responsive to the NAS request message, and wherein the response message comprises the extended DRX support information.

15. The non-transitory computer-readable storage medium according to claim 14, wherein the response message is an attach accept message.

16. The non-transitory computer-readable storage medium according to claim 13, wherein the NAS request message is an attach request message.

* * * * *